(12) United States Patent
Funahashi

(10) Patent No.: US 8,324,313 B2
(45) Date of Patent: Dec. 4, 2012

(54) THERMALLY CONDUCTIVE RESIN COMPOSITION

(75) Inventor: Hajime Funahashi, Toyota (JP)

(73) Assignee: Fuji Polymer Industries Co., Ltd., Aichi (JP)

( * ) Notice: Subject to any disclaimer, the term of this patent is extended or adjusted under 35 U.S.C. 154(b) by 215 days.

(21) Appl. No.: 12/920,895

(22) PCT Filed: Apr. 21, 2009

(86) PCT No.: PCT/JP2009/057931
§ 371 (c)(1),
(2), (4) Date: Sep. 3, 2010

(87) PCT Pub. No.: WO2009/136542
PCT Pub. Date: Nov. 12, 2009

(65) Prior Publication Data
US 2011/0009544 A1    Jan. 13, 2011

(30) Foreign Application Priority Data

May 8, 2008  (JP) ................................. 2008-122511
May 8, 2008  (JP) ................................. 2008-122512
Jan. 14, 2009 (WO) ................. PCT/JP2009/050376

(51) Int. Cl.
*C08L 83/04* (2006.01)
(52) U.S. Cl. ..................................... 524/588
(58) Field of Classification Search ............. 524/588
See application file for complete search history.

(56) References Cited

U.S. PATENT DOCUMENTS

| | | | |
|---|---|---|---|
| 4,444,944 A | 4/1984 | Matsushita | |
| 4,604,424 A | 8/1986 | Cole et al. | |
| 5,039,544 A | 8/1991 | Lansbergen et al. | |
| 6,096,414 A * | 8/2000 | Young | 428/220 |
| 2004/0254275 A1 | 12/2004 | Fukui et al. | |
| 2009/0253846 A1 | 10/2009 | Fukui | |

FOREIGN PATENT DOCUMENTS

| | | |
|---|---|---|
| EP | 1403326 A1 | 3/2004 |
| JP | 58-219259 | 12/1983 |
| JP | 62-184058 | 8/1987 |
| JP | 62-251466 | 11/1987 |
| JP | 2-41362 | 2/1990 |
| JP | 2-97599 | 4/1990 |
| JP | 11-209618 | 8/1999 |
| JP | 2006-36915 | 2/2006 |
| JP | 2006-274154 | 10/2006 |
| JP | 2008-106231 | 5/2008 |
| WO | WO 02/092693 | 11/2002 |
| WO | WO 2006/107003 A1 | 10/2006 |

OTHER PUBLICATIONS

International Search Report of Application No. PCT/JP2009/057931, dated Jun. 9, 2009, 2 pages.
International Publication WO 2009/136542 A1 for Application No. PCT/JP2009/057931, dated Nov. 12, 2009, 52 pages.

* cited by examiner

*Primary Examiner* — Kuo-Liang Peng
(74) *Attorney, Agent, or Firm* — Hamre, Schumann, Mueller & Larson, P.C.

(57) ABSTRACT

The thermally conductive resin composition of the present invention contains (a) a matrix component, (b) a larger-diameter thermally conductive inorganic powder, (c) a smaller-diameter thermally conductive inorganic powder, and (d) a vulcanizing agent and/or curing agent. The surface of the smaller-diameter thermally conductive inorganic powder is selectively treated with a silane compound represented by $R(CH_3)_a Si(OR')_{3-a}$ (wherein R is an unsubstituted or substituted organic group having 6 to 20 carbon atoms, R' is an alkyl group having 1 to 4 carbon atoms, and a is 0 or 1) or a partially hydrolyzed product thereof, and the amount thereof is smaller than the amount necessary to coat the entire surface area of the smaller-diameter thermally conductive inorganic powder. Accordingly, a thermally conductive resin composition that has a low hardness and a high thermal conductivity and that undergoes little outgassing and has storage stability is provided even when large amounts of thermally conductive inorganic powder is loaded into the resin component.

14 Claims, No Drawings

THERMALLY CONDUCTIVE RESIN COMPOSITION

TECHNICAL FIELD

The present invention relates to a thermally conductive resin composition for use in thermally conductive components and similar components of, for example, electronic parts. Specifically, the present invention provides heat-dissipating material compositions such as polymer-based rubbers, gels, and putties having a high thermal conductivity, and relates to a composition useful in the production of such heat-dissipating materials.

BACKGROUND ART

Devices using semiconductors, such as computers (CPUs), transistors, and light-emitting diodes (LEDs), generate heat when used, and the performance of electronic parts may be degraded due to the heat. Therefore, radiators are attached to such electronic parts that generate heat. However, such radiators are usually made of metal, and the radiating portion does not adhere well to electronic parts. Accordingly, a method that interposes a thermally conductive composition processed in a sheet form therebetween to enhance adhesion has been employed. However, the recent advances in the performance of electronic parts is significant, and accordingly the amount of heat generated has become very large. Therefore, research efforts actively have been made on thermally conductive polymer compositions having enhanced thermal conductivity. Such thermally conductive polymer compositions have to contain large amounts of thermally conductive inorganic powder for the enhancement of the thermal conductivity of heat-dissipating materials, which is the ultimate goal. It is, however, known that a mere increase in the amount of thermally conductive inorganic powder results in various problems. For example, there are problems in that the hardness is increased excessively in the case of an elastomeric heat-dissipating material, thereby not allowing a specifically narrow space to be provided between an electronic part and a radiator, or the gap between an electronic part and a radiator to be filled as desired. Moreover, in the case of an elastomeric or gel heat-dissipating material, compression set is increased and long-term reliability is likely to be deteriorated. Furthermore, there are problems in that, for example, the viscosity of a composition prior to curing is increased, thereby greatly impairing the workability, or the change over time of curing characteristics is aggravated.

To address these problems, various methods have been proposed. Methods that use a thermally conductive inorganic powder that has a specific particle size distribution or shape, or combinations of several types of thermally conductive inorganic powders have been proposed. Previously proposed are the use of a thermally conductive inorganic powder having a broad particle size distribution (Patent Document 1), a heat-dissipating material that uses 10 to 50 μm of spherical alumina and less than 10 μm of nonspherical alumina (Patent Document 2), the use of 0.1 to 5 μm of amorphous alumina and 5 to 50 μm of spherical alumina (Patent Document 3), the use of alumina having an average particle diameter of 2 to 10 μm and an oil absorbency of 15 ml/g (Patent Document 4), etc. Furthermore, methods in which the surface of a thermally conductive inorganic powder is treated also have been proposed, and there are proposals of a heat-dissipating material in which a surface treatment agent is applied to a combination of zinc oxide and magnesium oxide (Patent Document 5), a treatment with a long-chain aliphatic alkylalkoxysilane having 6 or more carbon atoms (Patent Document 6), a treatment with siloxane having an alkoxysilyl functional group at one terminal (Patent Document 7), and a treatment of a thermally conductive inorganic powder with a silane coupling agent (Patent Document 8). While these conventional methods attain high thermal conductivity and excellent heat dissipation, they result in extensive outgassing due to the surface treatment agent and in increased rubber hardness, and are highly problematic in terms of the storage stability of the materials.

CITATION LIST

Patent Documents

Patent Document 1: JP H2-97599 A
Patent Document 2: JP S62-251466 A
Patent Document 3: JP H2-41362 A
Patent Document 4: JP S58-219259 A
Patent Document 5: JP S62-184058 A
Patent Document 6: JP H11-209618 A
Patent Document 7: WO2002-092693
Patent Document 8: JP 2008-106231 A

DISCLOSURE OF INVENTION

Problem to be Solved by the Invention

The present invention provides a thermally conductive resin composition that, even when large amounts of thermally conductive inorganic powder are loaded into a resin, undergoes less outgassing resulting from a surface treatment agent, has a lower hardness and a higher thermal conductivity, and is more storage stable and more advantageous with regard to production cost than the aforementioned conventional thermally conductive resin compositions.

The thermally conductive resin composition of the present invention is a thermally conductive resin composition containing:

(a) a matrix component,
(b) a larger-diameter thermally conductive inorganic powder having a specific surface area of 0.06 to 1.0 m²/g,
(c) a smaller-diameter thermally conductive inorganic powder having a pre-treatment specific surface area of greater than 1.0 to 20 m²/g, and
(d) a vulcanizing agent and/or curing agent.

The surface of the smaller-diameter thermally conductive inorganic powder of the component (c) is treated with a silane compound represented by $R(CH_3)_a Si(OR')_{3-a}$ (R is an unsubstituted or substituted organic group having 6 to 20 carbon atoms, R' is an alkyl group having 1 to 4 carbon atoms, and a is 0 or 1) or a partially hydrolyzed product thereof, and the amount thereof is smaller than the amount necessary to coat the entire surface area of the smaller-diameter thermally conductive inorganic powder.

The proportion of the surface area of the larger-diameter thermally conductive inorganic powder of the component (b) is 10% or less of the total surface area of the larger-diameter thermally conductive inorganic powder of the component (b) and the smaller-diameter thermally conductive inorganic powder of the component (c).

The thermal conductivity is 0.8 W/m·K or greater.

Effects of the Invention

The present invention can provide a thermally conductive resin composition that undergoes little outgassing resulting from the surface treatment agent and has a low hardness and a high thermal conductivity despite large amounts of thermally conductive inorganic powder being loaded into the resin. Moreover, the present invention can provide a thermally conductive resin composition for which the mixture of the ingredients before processing has storage stability and the production cost is low.

BEST MODE FOR CARRYING OUT THE INVENTION

The component (a) of the present invention is at least one selected from thermosetting resins, thermoplastic resins, and rubbers. Thermosetting resins include, but are not limited to, epoxy resins, phenol resins, unsaturated polyester resins, and melamine resins. Thermoplastic resins include, but are not limited to, polyethylene, polypropylene, and like polyolefins, polyester, nylon, ABS resins, methacrylic resins, polyphenylene sulfide, fluororesins, polysulfone, polyether imide, polyether sulphone, polyether ketone, liquid-crystal polyester, and polyimide. It is also possible to use a mixture of two or more thermoplastic resins. Rubbers include, but are not limited to, natural rubber (NR in the ASTM abbreviation), polyisoprene rubber (IR), butadiene rubber (BR), 1,2-polybutadiene (1,2-BR), styrene-butadiene (SBR), chloroprene rubber (CR), nitrile rubber (NBR), butyl rubber (IIR), ethylene-propylene rubber (EPM, EPDM), chlorosulfonated polyethylene (CSM), acrylic rubber (ACM, ANM), epichlorohydrin rubber (CO, ECO), polysulfide rubber (T), silicone rubber (Q), fluororubber (FKM), and urethane rubber (U).

The component (b) of the present invention is a larger-diameter thermally conductive inorganic powder having a specific surface area of 0.06 to 1.0 $m^2/g$. The larger-diameter thermally conductive inorganic powder preferably is at least one selected from alumina, zinc oxide, magnesium oxide, and silica. The shape of the larger-diameter thermally conductive inorganic powder may be spherical, flaky, polyhedral, amorphous, or the like, but as long as the specific surface area is within the range of 0.06 to 1.0 $m^2/g$, a larger-diameter thermally conductive inorganic powder of any shape can be used. The aforementioned specific surface area is a BET specific surface area and may be measured according to JIS R1626. Assuming that the particles are spherical, the particles of the larger-diameter thermally conductive inorganic powder having a specific surface area of 0.06 to 1.0 $m^2/g$ have an average particle diameter d50 of 20 μm or greater. In this case also, the particle diameter may be measured according to the laser diffraction scattering method. Since the shape of the inorganic powder may be flaky, polyhedral, amorphous, or the like in addition to being spherical as mentioned above, it may not be suitable to specify the inorganic powder generally by the average particle diameter, and it is thus reasonable to specify it by the specific surface area.

The component (c) of the present invention is a smaller-diameter thermally conductive inorganic powder having a specific surface area of greater than 1 to 20 $m^2/g$. The smaller-diameter thermally conductive inorganic powder preferably is at least one selected from alumina, zinc oxide, magnesium oxide, and silica. The shape of the smaller-diameter thermally conductive inorganic powder may be spherical, flaky, polyhedral, or the like, but as long as the specific surface area is within the range of 1 to 20 $m^2/g$, a smaller-diameter thermally conductive inorganic powder of any shape can be used. The aforementioned specific surface area is a BET specific surface area and may be measured according to JIS R1626. Assuming that the particles are spherical, the particles of the smaller-diameter thermally conductive inorganic powder having a specific surface area of greater than 1 to 20 $m^2/g$ has an average particle diameter d50 of less than 20 μm. In this case also, the particle diameter may be measured according to the laser diffraction scattering method. Since the shape of the inorganic powder may be flaky, polyhedral, amorphous, or the like in addition to being spherical as mentioned above, it may not be suitable to specify the inorganic powder generally by the average particle diameter, and it is thus reasonable to specify it by the specific surface area.

The surface of the smaller-diameter thermally conductive inorganic powder is treated with a silane compound represented by $R(CH_3)_a Si(OR')_{3-a}$ (R is an unsubstituted or substituted organic group having 6 to 20 carbon atoms, R' is an alkyl group having 1 to 4 carbon atoms, and a is 0 or 1) or a partially hydrolyzed product thereof. Examples of silane compounds represented by $R(CH_3)_a Si(OR')_{3-a}$ (R is an unsubstituted or substituted organic group having 6 to 20 carbon atoms, R' is an alkyl group having 1 to 4 carbon atoms, and a is 0 or 1) (hereinafter simply referred to as "silanes") include hexyltrimethoxysilane, hexyltriethoxysilane, octyltrimethoxysilane, octyltriethoxysilane, decyltrimetoxysilane, decyltriethoxysilane, dodecyltrimethoxysilane, dodecyltriethoxysilane, hexadodecyltrimethoxysilane, hexadodecyltriethoxysilane, octadecyltrimethoxysilane, and octadecyltriethoxysilane. Such silane compounds may be used singly or as a combination of two or more.

The surface of the aforementioned component smaller-diameter thermally conductive inorganic powder is treated with a silane or a mixture of two or more silanes represented by $R(CH_3)_a Si(OR')_{3-a}$ (R is an unsubstituted or substituted organic group having 6 to 20 carbon atoms, R' is an alkyl group having 1 to 4 carbon atoms, and a is 0 or 1). "Surface treatment" herein encompasses adsorption and the like in addition to covalent bonding.

Treatment methods include (1) a dry method, (2) a wet method, (3) an integral blending method, and the like, but the integral blending method results in large amounts of volatilized material and is thus not preferable.

(1) Dry Method

The dry method is a method that performs a surface treatment by adding a chemical to a thermally conductive inorganic powder dropwise while stirring the thermally conductive inorganic powder with a mechanical stirrer such as a Henschel mixer, a Nauta mixer, or a vibration mill. "Chemical" refers to a solution prepared by diluting a silane with an alcoholic solvent, a solution prepared by diluting a silane with an alcoholic solvent and further adding thereto water, a solution prepared by diluting a silane with an alcoholic solvent and further adding thereto water and an acid, and a similar solution. Although methods of preparing the chemical may be described in catalogues or the like provided by the manufacturers of silane coupling agents, the method to be selected is determined according to the treatment method selected according to the rate of hydrolysis of the silane or to the type of thermally conductive inorganic powder.

(2) Wet Method

The wet method is a method that directly impregnates a thermally conductive inorganic powder with a chemical. Here, "chemical" refers to a solution prepared by diluting a silane with an alcoholic solvent, a solution prepared by diluting a silane with an alcoholic solvent and further adding thereto water, a solution prepared by diluting a silane with an alcoholic solvent and further adding thereto water and an acid, and a similar solution. For methods of preparing a chemical, the method to be selected is determined according to the treatment method selected according to the rate of hydrolysis of the silane or the type of thermally conductive inorganic powder.

(3) Integral Blending Method

The integral blending method is a method that introduces an undiluted silane or a silane after dilution with an alcohol or the like directly into a mixer when mixing a resin and a thermally conductive inorganic powder and then stirring is performed. Although the method for preparing a chemical may be the same as in the dry method or the wet method, the amount of silane in performing the integral blending method is generally larger than in performing the dry method or the wet method.

In the dry method and the wet method, drying of the chemical is performed if necessary. In the case where a chemical that uses an alcohol or the like is added, the alcohol needs to be volatilized. If the alcohol eventually remains in the composition, it will adversely affect the polymer component and will be released from the finished product as a gas. It is preferable that the drying temperature is higher than the boiling point of the solvent used. In addition, it is preferable to perform heating to high temperatures using a device to remove promptly the silane that has not reacted with the thermally conductive inorganic powder, but it is preferable to consider the heat resistance of the silane and keep the temperature lower than the decomposition point of the silane. It is preferable that the treatment temperature is about 80 to 150° C. and the treatment time is 0.5 to 4 hours. Suitably selecting the drying temperature and the time according to the treatment amount allows the solvent and the unreacted silane to be removed.

The amount of silane necessary for treating the surface of the thermally conductive inorganic powder can be calculated according to the following formula:

Amount of silane compound(g)=Amount of thermally conductive inorganic powder(g)×Specific surface area of thermally conductive inorganic powder ($m^2/g$)/Minimum silane coating area($m^2/g$)

The "Minimum silane coating area" is determined according to the following formula:

Minimum coating area($m^2/g$)=($6.02\times10^{23}$)× ($13\times10^{-20}$)/molecular weight of silane wherein $6.02\times10^{23}$ is Avogadro's constant, and $13\times10^{-20}$ is the area coated by one silane molecule (0.13 $nm^2$).

The necessary amount of silane preferably is from 0.5 times to less than 1.0 times the amount of silane calculated according to this formula. The upper limit being less than 1.0 times the calculated amount is to control the amount of silane actually present on the surface of the thermally conductive inorganic powder to be smaller than 1.0 times taking into consideration the unreacted silane. The lower limit is 0.5 times the amount calculated according to the aforementioned formula because the amount that is 0.5 times the calculated amount is sufficiently effective in enhancing the loadability of the thermally conductive inorganic powder into the rubber.

It is possible to treat the larger-diameter thermally conductive inorganic powder in a similar manner. However, since the larger-diameter thermally conductive inorganic powder originally has a small specific surface area, a surface treatment with a silane does not significantly enhance the loadability into the resin, and the expense of the treatment will increase the cost; therefore, the treatment is not necessary. However, if a treatment needs to be performed even after considering the increase of cost, a treated larger-diameter thermally conductive inorganic powder may be used. Treating the larger-diameter thermally conductive inorganic powder according to the dry method is problematic in that not only is the expense of the silane increased but also the treatment cost is increased. Alumina is second in hardness to diamond in terms of Mohs hardness. Therefore, a stainless-steel pot and stirring blades are worn severely by performing stirring in a device. Wear is more significant if the stirring speed is high. Therefore, a treated larger-diameter thermally conductive inorganic powder often appears dark by being contaminated with the metal from a worn device. When these problems and the loadability into the resin are considered, it is preferable not to treat the larger-diameter thermally conductive inorganic powder. Accordingly, it is preferable in the present invention to selectively treat the smaller-diameter thermally conductive inorganic powder of the component (c).

In regard to the amount of thermally conductive inorganic powder added to the resin, the proportion of the surface area of the larger-diameter thermally conductive inorganic powder of the component (b) is 10% or less of the total surface area of the larger-diameter thermally conductive inorganic powder of the component (b) and the smaller-diameter thermally conductive inorganic powder of the component (c). More specifically, it may be as follows:

Surface area of larger-diameter thermally conductive inorganic powder of component(b)($m^2$)=Amount of thermally conductive inorganic powder(g)× Specific surface area of thermally conductive inorganic powder($m^2/g$)   I Surface area of smaller-diameter thermally conductive inorganic powder of component(c)($m^2$)=Amount of thermally conductive inorganic powder(g)× Specific surface area of thermally conductive inorganic powder($m^2/g$)   II $[I/(I+II)]\times100\leq10$ The larger-diameter thermally conductive inorganic powder of the component (b) need not be a single type of powder, but may be a combination of several types of larger-diameter thermally conductive inorganic powders having a specific surface area within the range of 0.06 to 1.0 $m^2/g$.

Similarly, the smaller-diameter thermally conductive inorganic powder of the component (c) need not be a single type of powder, but may be a combination of several types of smaller-diameter thermally conductive inorganic powders having a specific surface area within the range of 1 to 20 $m^2/g$. Furthermore, the type of silane and the treatment method for the surface treatment of smaller-diameter thermally conductive inorganic powders used in combination may be varied.

There are various types of alumina. According to the crystal system, there is for example α-, γ-, and θ-alumina, and it is particularly preferable to use α-alumina due to its high thermally conductivity. It is preferable that the purity is greater than 99.5 mass % and the sodium content is as small as possible. There are a variety of shapes, for example, flaky, spherical, and polyhedral shapes. One commercially available product or a combination of two or more commercially available products may be used suitably. Among the products having the same average particle diameter, spherical products have a smaller specific surface area. When the particle size distribution is broad, the specific surface area tends to be large.

Zinc oxide, magnesium oxide, and silica also have various shapes, for example, amorphous and spherical shapes. One commercially available product or a combination of two or more commercially available products may be used suitably. Zinc oxide, magnesium oxide, and silica of a high purity are desirable.

Platinum catalysts include, but are not limited to, chloroplatinic acid, modified platinum-alcohol complexes, platinum-carbonylvinylmethyl complexes, platinum-divinyltetramethyldisiloxane complexes, and platinum-cyclovinylmethylsiloxane complexes. One platinum catalyst or a combination of two or more platinum catalysts may be used suitably. The amount is within the range of 1 to 100 ppm in terms of platinum atom.

The thermally conductive polymer composition to be cured with the platinum catalyst needs to have an excellent storage stability before being cured. During the production process, after introducing the thermally conductive inorganic powders into the polymer component, the step of curing molding or vulcanization molding may not necessarily be performed immediately. This may be due to a holiday, for example. In such a case, the properties exhibited after curing molding or vulcanization molding that is performed immediately after kneading the thermally conductive inorganic powders with the polymer component and those exhibited after curing molding or vulcanization molding that is performed after kneading the thermally conductive inorganic powders with the polymer component and storing the kneaded material for a while need to be identical. While the thermal conductivity depends on the amount of thermally conductive inorganic powder introduced into the polymer component, physical properties of a rubber, such as hardness, tensile strength, elongation, tear strength, or modulus, may vary considerably unless curing or vulcanization is performed sufficiently. To prevent such variations, it is necessary to avoid the deactivation of a platinum catalyst or a crosslinking agent that is a member of the polymer component during storage. After adding an untreated thermally conductive inorganic powder to the polymer component and storing the mixture for a while, the mixture often does not cure even when attempting to cure it. This is because the thermally conductive inorganic powder adsorbs the platinum catalyst and the crosslinking agent that is a member of the polymer component. When the thermally conductive inorganic powder is viewed microscopically, the surface of the thermally conductive inorganic powder is quite rough. The platinum catalyst and the crosslinking agent that is a member of the polymer component are adsorbed thereon. This lowers the concentration of the platinum catalyst and the concentration of the crosslinking agent that is a member of the polymer component in the polymer component system, and the polymer component therefore does not cure even after an attempt to cure it. The greater the specific surface area of the thermally conductive inorganic powder, the more significant the adsorption. Therefore, from the viewpoint of storability, it is effective to treat selectively the surface of the smaller-diameter thermally conductive inorganic powder only.

The same effect can be obtained by treating the surface of the larger-diameter thermally conductive inorganic powder in the same manner. Since the larger-diameter thermally conductive inorganic powder originally has a small specific surface area, it barely adsorbs the platinum catalyst and the crosslinking agent. Nonetheless, depending on the type of larger-diameter thermally conductive inorganic powder selected, the platinum catalyst and the crosslinking agent may be deactivated during storage. This occurs largely due to the properties of the larger-diameter thermally conductive inorganic powder itself, and the deactivation of the platinum catalyst is a primary cause. Moreover, such a tendency is likely to be exhibited when a high content of sodium or the like is present.

A crosslinking agent that is a type of polymer component is added to the thermally conductive polymer composition that is cured with the platinum catalyst. Any polymer component can be used as long as it is dispersible and functions as a crosslinking agent, and a methylhydrogensiloxane-dimethylsiloxane copolymer or a methylhydrogensiloxane-dimethylsiloxane copolymer modified to be readily soluble in the polymer component may be used.

A softening agent composed of a polymer component is regarded as a polymer component. There are naphthene-based, paraffin-based, and other softening agents, and they are suitably selected according to a polymer component selected.

A softening agent not composed of a polymer component, such as a phosphoric ester, is not regarded as a polymer component. However, a component that becomes polymeric due to curing is regarded as a polymer component.

A titanium coupling agent, an aluminium coupling agent, or a zirconium coupling agent may be used in the surface treatment of the thermally conductive inorganic powder, and a silane coupling agent having $R(CH_3)_a Si(OR')_{3-a}$ (R is an unsubstituted or substituted organic group having 6 to 20 carbon atoms, R' is an alkyl group having 1 to 4 carbon atoms, and a is 0 or 1) is usable simultaneously with a thermally conductive inorganic powder treated with one such agent or a mixture of two or more such agents.

Pigments, heat resisting agents, and flame retardants can be added as other additives if necessary. Pigments include inorganic pigments and organic pigments, and preferable are inorganic pigments. Specific examples include, but are not limited to, iron oxide and cobalt oxide. Heat resisting agents also include inorganic heat resisting agents and organic heat resisting agents. Inorganic heat resisting agents include, but are not limited to, cerium oxide, cerium hydroxide, and iron oxide, and organic heat resisting agents include, but are not limited to, phenol-based antioxidants, phosphite-based antioxidants, and thioether-based antioxidants. Flame retardants include, but are not limited to, phosphorus-based flame retardants, phosphate-based flame retardants, iron oxide, carbon, and metal hydroxide. None should inhibit the curing or the vulcanization reaction of the polymer component, and furthermore an additive that does not affect the properties of the polymer component is suitably selected. One additive or a mixture of two or more additives may be added.

In the present invention, the amount of volatilized gas derived from the component (c) preferably is 5 $\mu g/cm^2$ or less. The amount of volatilized gas derived from the component (c) refers to the silane remaining as an unreacted component during the surface treatment and the decomposition product thereof. A method for measuring the amount of volatilized gas is preferably performed using a gas chromatograph. In the present invention, measurements are performed as follows. A resin composition having a thickness of 2 mm is provided, shaped to have a length of 13 mm and a width of 30 mm, and further divided into four equal parts. They are charged into a vial having a capacity of 22 ml and exposed to heat at 100° C. for 20 minutes, and the gas thus generated is quantified with a gas chromatograph. The measuring device for use may be a GC-2010 manufactured by Shimadzu Corporation, the column may be a DB-5, and the detector may be an FID.

EXAMPLES

The present invention shall be described in more detail by way of examples, but the present invention is not limited to the examples.

Examples 1 to 9 and Comparative Examples 1 to 9

1. Materials
(1) Polymer Components

Polyisobutylenes EP200A (trade name, manufactured by Kaneka Corporation), PAO-5010 (trade name, manufactured by Idemitsu Kosan Co., Ltd.), and CR300 (trade name, manufactured by Kaneka Corporation) were used as polymer components.

(2) Platinum Catalyst and Retardant

PT-VTSC-3.0 IPA (trade name, manufactured by Umicore Precious Metals Japan) was used as a platinum catalyst, and Surfynol 61 (trade name, manufactured by Nissin Chemical Industry Co., Ltd.) was used as a retardant.

(3) Smaller-Diameter Thermally Conductive Inorganic Powder

AL43L (trade name, manufactured by Showa Denko K. K., specific surface area of 3.2 m$^2$/g, average particle diameter d50 according to laser diffraction scattering of 1.1 μm) was used as a smaller-diameter thermally conductive inorganic powder.

(4) Larger-Diameter Thermally Conductive Inorganic Powder

AS10 (trade name, manufactured by Showa Denko K. K., specific surface area of 0.5 m$^2$/g, average particle diameter d50 according to laser diffraction scattering of 39 μm) was used as a larger-diameter thermally conductive inorganic powder.

(5) Silane

Hexyltriethoxysilane KBE3063 (trade name, manufactured by Shin-Etsu Chemical Co., Ltd.) was used as a silane. The necessary amount of KBE3063 was calculated according to the formula: Necessary amount of KBE3063 (g)=Amount of thermally conductive inorganic powder (g)×Specific surface area of thermally conductive inorganic powder (m$^2$/g)/ Minimum silane coating area (m$^2$/g). The minimum KBE3063 coating area was 315 m$^2$/g, and thus 1000 g×3.2 m$^2$/g/315 m$^2$/g=10.2 g.

(6) Silane Treatment of Inorganic Powder 1

The smaller-diameter thermally conductive inorganic powder was subjected to the following treatment.
(Dry Method 1)

One kilogram of AL43L was introduced into a blender, and while stirring it, 10.2 g of KBE3063 was added slowly. The mixture was stirred for 15 minutes, left to stand for 1 day, and then dried at 100° C. for 2 hours.
(Dry Method 2)

One kilogram of AL43L was introduced into a blender, and while stirring it, a chemical in which 10.2 g of KBE3063, 20 g of isopropanol, and 1 g of water were mixed was added slowly. The mixture was stirred for 15 minutes, left to stand for 1 day, and then dried at 100° C. for 2 hours.
(Wet Method)

One kilogram of AL43L was introduced into a blender, and while stirring it, a chemical in which 10.2 g of KBE3063, 1000 g of isopropanol, and 0.5 g of water were mixed was added slowly. The mixture was stirred for 30 minutes and left to stand as-is for 1 day. The mixture was dried at 100° C. for 2 hours after removing the solvent components.

(7) Silane Treatment of Inorganic Powder 2

The larger-diameter thermally conductive inorganic powder was subjected to the following treatment.
(Dry Method 2)

For As10: 1 kg of AS10 was introduced into a blender, and while stirring it, a chemical in which 1.6 g of KBE3063, 10 g of isopropanol, and 0.5 g of water were mixed was added slowly. The mixture was stirred for 15 minutes, left to stand for 1 day, and then dried at 100° C. for 2 hours.

For AW50-74: 1 kg of AS10 was introduced into a blender, and while stirring it, a chemical in which 0.22 g of KBE3063, 5 g of isopropanol, and 0.1 g of water were mixed was added slowly. The mixture was stirred for 15 minutes, left to stand for 1 day, and then dried at 100° C. for 2 hours.
(Integral Method)

Carried out by adding a silane during composition preparation.

(8) Preparation of Compositions

The inorganic powders in specific parts by mass as well as iron oxide, the platinum catalyst, and the retardant were added to EP200A, PAO-5010, and CR300 each in specific parts by mass and stirred with a planetary mixer for 10 minutes while defoaming to yield a composition.

In the case where the surface treatment of an inorganic powder was performed according to the integral method, a silane was further added and the same processing was performed. The compositions were formulated according to the parameters of the Examples of Table 1 and the Examples of Table 2.

(9) Sheet Formation

A metal frame was placed on a polyester film having a thickness of 2 mm that had undergone a fluorine mold release treatment and a composition was poured into it. Another polyester film that had undergone a fluorine mold release treatment was placed over it. This was cured under a pressure of 5 MPa at 120° C. for 20 minutes to form a sample.

The parameters and the results of Examples 1 to 9 are presented together in Table 1, and the parameters and the results of Comparative Examples 1 to 9 are presented together in Table 2.

TABLE 1

|  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| Polyisobutylene (EP200A) | 33.3 | 33.3 | 33.3 | 33.3 | 33.3 | 33.3 | 33.3 | 33.3 | 33.3 |
| Polyisobutylene (PAO-5010) | 60 | 60 | 60 | 60 | 60 | 60 | 60 | 60 | 60 |
| Polyisobutylene (CR300) | 6.7 | 6.7 | 6.7 | 6.7 | 6.7 | 6.7 | 6.7 | 6.7 | 6.7 |
| Smaller-diameter powder (AL43L): dry method 1 | 150 | 250 | 300 | — | — | — | — | — | — |
| Smaller-diameter powder (AL43L): dry method 2 | — | — | — | 150 | 250 | 300 | — | — | — |
| Smaller-diameter powder (AL43L): wet method | — | — | — | — | — | — | 150 | 250 | 300 |
| Larger-diameter powder (AS10) | 100 | 100 | 200 | 100 | 100 | 200 | 100 | 100 | 200 |

TABLE 1-continued

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Smaller-diameter powder (AL43L): no treatment | — | — | — | — | — | — | — | — | — |
| Larger-diameter powder (AS10): dry method 2 | — | — | — | — | — | — | — | — | — |
| Coloring agent (iron oxide) | 4 | 4 | 4 | 4 | 4 | 4 | 4 | 4 | 4 |
| Platinum catalyst | 0.44 | 0.44 | 0.44 | 0.44 | 0.44 | 0.44 | 0.44 | 0.44 | 0.44 |
| Retardant | 0.16 | 0.16 | 0.16 | 0.16 | 0.16 | 0.16 | 0.16 | 0.16 | 0.16 |
| Hardness | 20 | 40 | 65 | 21 | 39 | 65 | 19 | 39 | 63 |
| Proportion (%) | 9.4 | 5.9 | 9.4 | 9.4 | 5.9 | 9.4 | 9.4 | 5.9 | 9.4 |
| Viscosity (Pa·s) | 60 | 150 | 230 | 65 | 157 | 241 | 62 | 151 | 235 |
| Thermal conductivity (W/m·K) | 0.81 | 1.2 | 1.7 | 0.81 | 1.2 | 1.7 | 0.81 | 1.2 | 1.7 |
| Amount of volatilized gas (μg/cm$^2$) | 1.1 | 0.8 | 0.4 | 0.4 | 0.3 | 0.2 | 0.5 | 0.4 | 0.4 |
| Amount of volatilized low-molecular siloxane (μg/cm$^2$) | 0 | 0 | 0 | 0 | 0 | 0 | 0 | 0 | 0 |

The amounts provided in the table are in part by mass. This also applies to the tables below.

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|
| Polyisobutylene (EP200A) | 33.3 | 33.3 | 33.3 | 33.3 | 33.3 | 33.3 | 33.3 | 33.3 | 33.3 |
| Polyisobutylene (PAO-5010) | 60 | 60 | 60 | 60 | 60 | 60 | 60 | 60 | 60 |
| Polyisobutylene (CR300) | 6.7 | 6.7 | 6.7 | 6.7 | 6.7 | 6.7 | 6.7 | 6.7 | 6.7 |
| Smaller-diameter powder (AL43L): dry method 1 | — | — | — | — | — | — | — | — | — |
| Smaller-diameter powder (AL43L): dry method 2 | — | — | — | — | — | — | 150 | 250 | 300 |
| Smaller-diameter powder (AL43L): wet method | — | — | — | — | — | — | — | — | — |
| Smaller-diameter powder (AL43L): no treatment | 150 | 250 | 300 | 150 | 250 | 300 | — | — | — |
| Larger-diameter powder (AS10) | 100 | 100 | 200 | 100 | 100 | 200 | — | — | — |
| Larger-diameter powder (AS10): dry method 2 | — | — | — | — | — | — | 100 | 100 | 200 |
| Coloring agent (iron oxide) | 4 | 4 | 4 | 4 | 4 | 4 | 4 | 4 | 4 |
| Hexyltriethoxysilane (KBE-3063) | — | — | — | 1.5 | 2.5 | 3.0 | — | — | — |
| Platinum catalyst | 0.44 | 0.44 | 0.44 | 0.44 | 0.44 | 0.44 | 0.44 | 0.44 | 0.44 |
| Retardant | 0.16 | 0.16 | 0.16 | 0.16 | 0.16 | 0.16 | 0.16 | 0.16 | 0.16 |
| Hardness | 40 | 53 | 67 | 20 | 41 | 66 | 40 | 51 | 66 |
| Proportion (%) | 9.4 | 5.9 | 9.4 | 9.4 | 5.9 | 9.4 | 9.4 | 5.9 | 9.4 |
| Viscosity (Pa·s) | 80 | 170 | 260 | 60 | 151 | 225 | 59 | 138 | 215 |
| Thermal conductivity (W/m·K) | 0.81 | 1.2 | 1.7 | 0.81 | 1.2 | 1.7 | 0.81 | 1.2 | 1.7 |
| Amount of volatilized gas (μg/cm$^2$) | 0 | 0 | 0 | 5.3 | 4.8 | 3.8 | 0.4 | 0.3 | 0.2 |
| Amount of volatilized low-molecular siloxane (μg/cm$^2$) | 0 | 0 | 0 | 0 | 0 | 0 | 0 | 0 | 0 |

In Tables 1 and 2, the proportions were calculated according to the formula (A) below (this also applies hereinafter).

Surface area of larger-diameter thermally conductive inorganic powder(m$^2$) = Amount of thermally conductive inorganic powder(g) × Specific surface area of thermally conductive inorganic powder (m$^2$/g)   I Surface area of smaller-diameter thermally conductive inorganic powder(m$^2$) = Amount of thermally conductive inorganic powder(g) × Specific surface area of thermally conductive inorganic powder (m$^2$/g)   II $$[I/(I+II)] \times 100 \quad (A)$$

The measurement of physical properties was performed according to the following methods.

(i) Thermal conductivity: measured according to the hot disk method (Kyoto Electronics Manufacturing Co., Ltd.)

using an apparatus for measuring thermophysical properties TPA-501 (trade name). A description of this apparatus is provided on their website.

The measurement samples were prepared as follows.

A sheet having a thickness of 2 mm that had been prepared according to the sheet forming method described in connection with the Examples and the Comparative Examples was cut to a length of 25 mm and a width of 25 mm. Four pieces of this sheet were placed one over another and were regarded collectively as a block. This block was provided in duplicate. A sensor having a diameter of 7 mm was sandwiched vertically between the blocks thus provided and then placed on a jig. The jig was squeezed at a torque of 30 N·cm. Note that pieces of a non self-adhering sheet were also placed one over another and regarded as one block.

In the measurement method, once installed into the jig, the block was given a cover that was part of the jig so that the block did not contact air, and stabilized for 15 minutes. After stabilization, the measurement was initiated and the numerical values were recorded. The same procedure was repeated when measuring another sample.

(ii) Hardness: ASTM D2240 Shore A
(iii) Amount of volatilized gas: headspace method using a gas chromatograph
(iv) Amount of volatilized low-molecular siloxane: headspace method using a gas chromatograph
(v) Viscosity (viscosity of composition before curing): measurement using a precision rotational viscometer It can be said from Table 1 that different surface treatment methods for the smaller-diameter thermally conductive inorganic powder did not result in greatly different physical properties, namely hardness and thermal conductivity. However, as is clear from Table 2, the integral blending method (Comparative Examples 4 to 6) resulted in large amounts of volatilized gas.

In Examples 1 to 9, a surface-treated thermally conductive inorganic powder was added, and therefore the viscosity of the compositions before curing was lower than in Comparative Examples 1 to 3. Similarly, the hardness was also lower in Examples 1 to 9 than in Comparative Examples 1 to 3.

Examples 10 to 12 and Comparative Examples 10 to 15

Next, experiments were carried out using a mixture of two or more types of smaller-diameter thermally conductive inorganic powders. In addition to the aforementioned alumina, AL160SG-1 (trade name, manufactured by Showa Denko K. K., specific surface area of 6.6 $m^2/g$, average particle diameter d50 according to laser diffraction scattering of 0.4 μm) and AW50-74 (trade name, manufactured by Micron Co., Ltd., specific surface area of 0.07 $m^2/g$, average particle diameter d50 according to laser diffraction scattering of 55 μm) were used. The AL160SG-1 thermally conductive inorganic powder was subjected to the following treatment.

(Dry Method 1)

One kilogram of AL160SG-1 was introduced into a blender, and while stirring it, 21.0 g of KBE3063 was added slowly. The mixture was stirred for 15 minutes, left to stand for 1 day, and then dried at 100° C. for 2 hours.

(Dry Method 2)

One kilogram of AW50-74 was introduced into a blender, and while stirring it, a chemical in which 0.22 g of KBE3063, 5 g of isopropanol, and 0.1 g of water were mixed was added slowly. The mixture was stirred for 15 minutes, left to stand for 1 day, and then dried at 100° C. for 2 hours. The method of preparing compositions and the sheet formation were carried out in the same manner as in Examples 1 to 9 of Table 1 and Comparative Examples 1 to 9 of Table 2. The compositions were formulated according to the parameters presented in Table 3.

The parameters and the results of Examples 10 to 12 and Comparative Examples 10 to 15 are presented together in Table 3.

TABLE 3

|  | Ex. 10 | Ex. 11 | Ex. 12 | Comp. Ex. 10 | Comp. Ex. 11 | Comp. Ex. 12 | Comp. Ex. 13 | Comp. Ex. 14 | Comp. Ex. 15 |
|---|---|---|---|---|---|---|---|---|---|
| Polyisobutylene (EP200A) | 33.3 | 33.3 | 33.3 | 33.3 | 33.3 | 33.3 | 33.3 | 33.3 | 33.3 |
| Polyisobutylene (PAO-5010) | 60 | 60 | 60 | 60 | 60 | 60 | 60 | 60 | 60 |
| Polyisobutylene (CR300) | 6.7 | 6.7 | 6.7 | 6.7 | 6.7 | 6.7 | 6.7 | 6.7 | 6.7 |
| Smaller-diameter powder (AL160SG-1): dry method 1 | 100 | 200 | 50 | — | — | — | 100 | 200 | 50 |
| Smaller-diameter powder (AL43L): dry method 1 | 100 | 200 | 50 | — | — | — | 100 | 200 | 50 |
| Smaller-diameter powder (AL160SG-1): no treatment | — | — | — | 100 | 200 | 50 | — | — | — |
| Smaller-diameter powder (AL43L): no treatment | — | — | — | 100 | 200 | 50 | — | — | — |
| Large-diameter powder (AW50-74): no treatment | 400 | 400 | 700 | 400 | 400 | 700 | — | — | — |
| Large-diameter powder (AW50-74): dry method 2 | — | — | — | — | — | — | 400 | 400 | 700 |
| Coloring agent (iron oxide) | 4 | 4 | 4 | 4 | 4 | 4 | 4 | 4 | 4 |
| Platinum catalyst | 0.44 | 0.44 | 0.44 | 0.44 | 0.44 | 0.44 | 0.44 | 0.44 | 0.44 |
| Retardant | 0.16 | 0.16 | 0.16 | 0.16 | 0.16 | 0.16 | 0.16 | 0.16 | 0.16 |
| Hardness | 40 | 45 | 65 | 55 | 65 | 85 | 39 | 44 | 55 |
| Proportion (%) | 2.8 | 1.4 | 9.1 | 2.8 | 1.4 | 9.1 | 2.8 | 1.4 | 9.1 |
| Viscosity (Pa·s) | 235 | 750 | 624 | 255 | 784 | 707 | 220 | 710 | 599 |
| Thermal conductivity (W/m·K) | 1.6 | 2.2 | 2.3 | 1.6 | 2.2 | 2.3 | 1.6 | 2.2 | 2.3 |
| Amount of volatilized gas (μg/$cm^2$) | 3.0 | 3.5 | 0.9 | 0 | 0 | 0 | 3.3 | 3.7 | 0.9 |

TABLE 3-continued

|  | Ex. 10 | Ex. 11 | Ex. 12 | Comp. Ex. 10 | Comp. Ex. 11 | Comp. Ex. 12 | Comp. Ex. 13 | Comp. Ex. 14 | Comp. Ex. 15 |
|---|---|---|---|---|---|---|---|---|---|
| Amount of volatilized low-molecular siloxane ($\mu g/cm^2$) | 0 | 0 | 0 | 0 | 0 | 0 | 0 | 0 | 0 |

The description of the proportions and the physical properties is as presented after Tables 1 and 2.

As can be understood from Table 3, the silane treatment of the smaller-diameter thermally conductive inorganic powders having large specific surface areas enhanced the loadability into the polymer components and the rubber hardness was lowered. Moreover, the hardness was lowered, the thermal conductivity was increased, and the outgassing resulting from the surface treatment agent was reduced merely by the surface treatment of the smaller-diameter thermally conductive inorganic powders having large specific surface areas without treating the surface of the larger-diameter thermally conductive inorganic powder despite the polymer components being filled with large amounts of thermally conductive inorganic powder.

In Examples 10 to 12 of Table 3, surface-treated thermally conductive inorganic powders were added and therefore the viscosities of the compositions before curing was lower than those in Comparative Examples 10 to 12 of Table 3, respectively. Similarly, the hardness was also lower in Examples 10 to 12 than in Comparative Examples 10 to 12, respectively. The silane treatment of the smaller-diameter thermally conductive inorganic powders having large specific surface areas demonstrated a significant effect in lowering the composition viscosity and the rubber hardness.

Comparative Examples 13 to 15 of Table 3 were for an investigation of a powder obtained by treating a larger-diameter thermally conductive inorganic powder with a silane. Compared with the physical properties of Examples 10 to 12 of Table 3, the viscosities of the compositions were lower than those in Examples 10 to 12, but the values were similar for the hardness and the amount of volatilized gas. However, in Comparative Example 15 of Table 3, the amount of silane-treated larger-diameter thermally conductive inorganic powder loaded was large, and therefore the composition viscosity and the rubber hardness were lowered.

Examples 13 to 21 and Comparative Examples 16 to 24

In the following Examples and Comparative Examples, the same experiments as described above were performed using different polymer components.
(1) Ethylene-propylene copolymer X-4010 (trade name, manufactured by Mitsui Chemicals, Inc.), Diana Process Oil PW-90 (trade name, manufactured by Idemitsu Kosan Co., Ltd.), and CR300 (trade name, manufactured by Kaneka Corporation) were used as polymeric components.
(2) PT-VTSC-3.0 IPA (trade name, manufactured by Umicore Precious Metals Japan) was used as a platinum catalyst.
(3) Surfynol 61 (trade name, manufactured by Nissin Chemical Industry Co., Ltd.) was used as a retardant.
(4) Preparation of compositions
The inorganic powders in specific parts by mass as well as iron oxide, the platinum catalyst, and the retardant were added to X-4010, Diana. Process Oil PW-90, and CR300 each in specific parts by mass and stirred with a planetary mixer for 10 minutes while defoaming to yield a composition.
In the case where the surface treatment of an inorganic powder was performed according to the integral method, a silane was further added and the same processing was performed. The compositions were formulated according to the parameters of the Examples of Table 4 and the Examples of Table 5.
(5) Method of sheet formation
A metal frame was placed on a polyester film having a thickness of 2 mm that had undergone a fluorine mold release treatment and a lump of a composition was placed thereon. Another polyester film that had undergone a fluorine mold release treatment was placed over it. This was cured under a pressure of 5 MPa at 120° C. for 20 minutes.
The parameters and the results of Examples 13 to 21 are presented in Table 4, and the parameters and the results of Comparative Examples 16 to 24 are presented in Table 5. The amount of volatilized gas refers to the amount of KBE3063 remaining in the sheet.

TABLE 4

|  | Ex. 13 | Ex. 14 | Ex. 15 | Ex. 16 | Ex. 17 | Ex. 18 | Ex. 19 | Ex. 20 | Ex. 21 |
|---|---|---|---|---|---|---|---|---|---|
| Ethylene-propylene copolymer (X-4010) | 74 | 74 | 74 | 74 | 74 | 74 | 74 | 74 | 74 |
| Diana Process Oil (PW-90) | 20 | 20 | 20 | 20 | 20 | 20 | 20 | 20 | 20 |
| Polyisobutylene (CR300) | 6 | 6 | 6 | 6 | 6 | 6 | 6 | 6 | 6 |
| Smaller-diameter powder (AL43L): dry method 1 | 150 | 250 | 300 | — | — | — | — | — | — |
| Smaller-diameter powder (AL43L): dry method 2 | — | — | — | 150 | 250 | 300 | — | — | — |
| Smaller-diameter powder (AL43L): wet method | — | — | — | — | — | — | 150 | 250 | 300 |
| Large-diameter powder (AS10) | 100 | 100 | 200 | 100 | 100 | 200 | 100 | 100 | 200 |
| Large-diameter powder (AS10): dry method 2 | — | — | — | — | — | — | — | — | — |
| Coloring agent (iron oxide) | 5 | 5 | 5 | 5 | 5 | 5 | 5 | 5 | 5 |

TABLE 4-continued

|  | Ex. 13 | Ex. 14 | Ex. 15 | Ex. 16 | Ex. 17 | Ex. 18 | Ex. 19 | Ex. 20 | Ex. 21 |
| --- | --- | --- | --- | --- | --- | --- | --- | --- | --- |
| Platinum catalyst | 0.32 | 0.32 | 0.32 | 0.32 | 0.32 | 0.32 | 0.32 | 0.32 | 0.32 |
| Retardant | 0.16 | 0.16 | 0.16 | 0.16 | 0.16 | 0.16 | 0.16 | 0.16 | 0.16 |
| Hardness | 65 | 70 | 85 | 65 | 75 | 85 | 65 | 75 | 85 |
| Proportion (%) | 9.4 | 5.9 | 9.4 | 9.4 | 5.9 | 9.4 | 9.4 | 5.9 | 9.4 |
| Plasticity | 45.0 | 50.3 | 65.2 | 48.2 | 55.2 | 69.8 | 45.0 | 48.0 | 62.8 |
| Thermal conductivity (W/m · K) | 1.0 | 1.4 | 2.1 | 1.0 | 1.4 | 2.1 | 1.0 | 1.4 | 2.1 |
| Amount of volatilized gas (μg/cm$^2$) | 1.2 | 0.8 | 0.5 | 0.4 | 0.3 | 0.2 | 0.3 | 0.2 | 0.1 |
| Amount of volatilized low-molecular siloxane (μg/cm$^2$) | 0 | 0 | 0 | 0 | 0 | 0 | 0 | 0 | 0 |

TABLE 5

|  | Comp. Ex. 16 | Comp. Ex. 17 | Comp. Ex. 18 | Comp. Ex. 19 | Comp. Ex. 20 | Comp. Ex. 21 | Comp. Ex. 22 | Comp. Ex. 23 | Comp. Ex. 24 |
| --- | --- | --- | --- | --- | --- | --- | --- | --- | --- |
| Ethylene-propylene copolymer (X-4010) | 74 | 74 | 74 | 74 | 74 | 74 | 74 | 74 | 74 |
| Diana Process Oil (PW-90) | 20 | 20 | 20 | 20 | 20 | 20 | 20 | 20 | 20 |
| Polyisobutylene (CR300) | 6 | 6 | 6 | 6 | 6 | 6 | 6 | 6 | 6 |
| Smaller-diameter powder (AL43L): dry method 1 | — | — | — | — | — | — | — | — | — |
| Smaller-diameter powder (AL43L): dry method 2 | — | — | — | — | — | — | 150 | 250 | 300 |
| Smaller-diameter powder (AL43L): wet method | — | — | — | — | — | — | — | — | — |
| Large-diameter powder (AS10) | 100 | 100 | 200 | 100 | 100 | 200 | — | — | — |
| Large-diameter powder (AS10): dry method 2 | — | — | — | — | — | — | 100 | 100 | 200 |
| Large-diameter powder (AS 10): no treatment | 150 | 250 | 300 | 150 | 250 | 300 | — | — | — |
| Coloring agent (iron oxide) | 5 | 5 | 5 | 5 | 5 | 5 | 5 | 5 | 5 |
| Hardness | 60 | 73 | 85 | 61 | 72 | 83 | 64 | 74 | 85 |
| Hexyltriethoxysilane (KBE-3063) | — | — | — | 1.5 | 2.5 | 3.0 | — | — | — |
| Platinum catalyst | 0.32 | 0.32 | 0.32 | 0.32 | 0.32 | 0.32 | 0.32 | 0.32 | 0.32 |
| Retardant | 0.16 | 0.16 | 0.16 | 0.16 | 0.16 | 0.16 | 0.16 | 0.16 | 0.16 |
| Proportion (%) | 9.4 | 5.9 | 9.4 | 9.4 | 5.9 | 9.4 | 9.4 | 5.9 | 9.4 |
| Plasticity | 50.9 | 57.3 | 73.2 | 46.0 | 49.8 | 63.2 | 43.0 | 48.3 | 58.1 |
| Thermal conductivity (W/m · K) | 1.0 | 1.4 | 2.0 | 1.0 | 1.4 | 2.0 | 1.0 | 1.4 | 2.0 |
| Amount of volatilized gas (μg/cm$^2$) | 0 | 0 | 0 | 5.8 | 5.4 | 4.9 | 0.5 | 0.5 | 0.3 |
| Amount of volatilized low-molecular siloxane (μg/cm$^2$) | 0 | 0 | 0 | 0 | 0 | 0 | 0 | 0 | 0 |

The description of the proportions and the physical properties is as presented after Tables 1 and 2. The plasticity was measured using a Wallace plastometer.

Examples 13 to 15, Examples 16 to 18, and Examples 19 to 21 of Table 4 were for an investigation of different surface treatments of a smaller-diameter thermally conductive inorganic powder. The composition viscosity and the physical properties of a rubber such as rubber hardness and thermal conductivity were nearly identical. The amount of volatilized gas was varied depending on the surface treatment method.

A comparison of Examples 13 to 18 with Comparative Examples 16 to 18 reveals that the silane treatment of the surface of the smaller-diameter thermally conductive inorganic powder demonstrated an effect in lowering the composition viscosity and the rubber hardness.

A comparison of Examples 13 to 18 with Comparative Examples 19 to 21 reveals a significant difference in the amount of volatilized gas. Due to the treatment method, i.e., the integral method, Comparative Examples 19 to 21 resulted in considerable amounts of volatilized gas.

Comparative Examples 22 to 24 of Table 5 were for an investigation of a surface treatment also for a larger-diameter thermally conductive inorganic powder. Examples 13 to 18 of Table 4 were for an investigation of a treatment only for a smaller-diameter thermally conductive inorganic powder. A comparison reveals that the composition viscosity and the physical properties of a rubber such as rubber hardness and thermal conductivity were nearly identical.

Examples 22 to 24 and Comparative Examples 25 to 30

In Examples 22 to 24 and Comparative Examples 25 to 30 of Table 6 below, experiments were carried out according to Table 6 using a mixture of two or more types of smaller-diameter thermally conductive inorganic powders. AL160SG-1 (trade name, manufactured by Showa Denko K. K., specific surface area of 6.6 m²/g) and AW50-74 (trade name, manufactured by Micron Co., Ltd., specific surface area of 0.07 m²/g) were used for smaller-diameter thermally conductive inorganic powders, and the treatment method was carried out in the same manner as in the treatment of thermally conductive inorganic powders used in Examples 10 to 12 and Comparative Examples 10 to 15 of Table 3.

The parameters and the results of Examples 22 to 24 and Comparative Examples 25 to 30 mentioned above are presented together in Table 6.

enhances the loadability into the polymer components. This is apparent also from the fact that the values for the viscosity or the plasticity were lower. In addition, a selective silane treatment of only smaller-diameter thermally conductive inorganic powders can keep the amount of volatilized gas derived from the surface treatment agent small. In other words, it was possible to produce a thermally conductive polymer composition that had a low hardness and a high thermal conductivity, that barely produced volatilized gas derived from the surface treatment agent, and that was readily produced and stored merely by treating the surface of smaller-diameter thermally conductive inorganic powders having large specific surface areas without treating the surface of larger-diameter ther-

TABLE 6

|  | Ex. 22 | Ex. 23 | Ex. 24 | Comp. Ex. 25 | Comp. Ex. 26 | Comp. Ex. 27 | Comp. Ex. 28 | Comp. Ex. 29 | Comp. Ex. 30 |
|---|---|---|---|---|---|---|---|---|---|
| Ethylene-propylene copolymer (X-4010) | 74 | 74 | 74 | 74 | 74 | 74 | 74 | 74 | 74 |
| Diana Process Oil (PW-90) | 20 | 20 | 20 | 20 | 20 | 20 | 20 | 20 | 20 |
| Polyisobutylene (CR300) | 6 | 6 | 6 | 6 | 6 | 6 | 6 | 6 | 6 |
| Smaller-diameter powder (AL160SG-1): dry method 1 | 100 | 200 | 50 | — | — | — | 100 | 200 | 50 |
| Smaller-diameter powder (AL43L): dry method 1 | 100 | 200 | 50 | — | — | — | 100 | 200 | 50 |
| Smaller-diameter powder (AL160SG-1): no treatment | — | — | — | 100 | 200 | 50 | — | — | — |
| Smaller-diameter powder (AL43L): no treatment | — | — | — | 100 | 200 | 50 | — | — | — |
| Large-diameter powder (AW50-74): no treatment | 400 | 400 | 700 | 400 | 400 | 700 | — | — | — |
| Large-diameter powder (AW50-74): dry method 1 | — | — | — | — | — | — | 400 | 400 | 700 |
| Coloring agent (iron oxide) | 5 | 5 | 5 | 5 | 5 | 5 | 5 | 5 | 5 |
| Platinum catalyst | 0.32 | 0.32 | 0.32 | 0.32 | 0.32 | 0.32 | 0.32 | 0.32 | 0.32 |
| Retardant | 0.16 | 0.16 | 0.16 | 0.16 | 0.16 | 0.16 | 0.16 | 0.16 | 0.16 |
| Hardness | 77 | 83 | 90 | 80 | 87 | 95 | 75 | 83 | 89 |
| Proportion (%) | 2.8 | 1.4 | 9.1 | 2.8 | 1.4 | 9.1 | 2.8 | 1.4 | 9.1 |
| Plasticity | 47.2 | 69.0 | 98.6 | 68.0 | 81.0 | 99.1 | 42.0 | 69.1 | 89.3 |
| Thermal conductivity (W/m · K) | 1.8 | 2.6 | 2.2 | 1.8 | 2.6 | 2.2 | 1.8 | 2.6 | 2.2 |
| Amount of volatilized gas (µg/cm²) | 3.0 | 3.5 | 0.9 | 0 | 0 | 0 | 3.2 | 3.7 | 1.2 |
| Amount of volatilized low-molecular siloxane (µg/cm²) | 0 | 0 | 0 | 0 | 0 | 0 | 0 | 0 | 0 |

As can be understood from a comparison of Examples 22 to 24 with Comparative Examples 28 to 30 of Table 6, physical properties nearly identical to those attained with the surface-treated smaller-diameter thermally conductive inorganic powders were exhibited merely by the surface treatment of the smaller-diameter thermally conductive inorganic powders having large specific surface areas without treating the surface of the larger-diameter thermally conductive inorganic powder.

In contrast, as can be understood from a comparison of Example 22 with Comparative Example 25, Example 23 with Comparative Example 26, and Example 24 with Comparative Example 27, the hardness tended to be higher unless the surface of the smaller-diameter thermally conductive inorganic powders was treated.

As described above, Examples 1 to 24 and Comparative Examples 1 to 30 demonstrated that the selective silane treatment of smaller-diameter thermally conductive inorganic powders having large specific surface areas sufficiently enhances the loadability into the polymer components. This is mally conductive inorganic powders, despite large amounts of thermally conductive inorganic powder being loaded into polymeric components.

Comparative Examples 31 to 34

Next, an investigation was carried out for a surface treatment using a silane in an amount twice as much as the calculated amount with which the entire surface of smaller-diameter inorganic powders (AL43L and AL160SG-1) can be coated. An investigation was also carried out for a case in which the value according to the aforementioned formula (A) exceeded 10.

(Dry Method 3)
(1) For Treatment of AL43L
One kilogram of AL43L was introduced into a blender, and while stirring it, 20.2 g of KBE3063 was added slowly. The mixture was stirred for 15 minutes, left to stand for 1 day, and then dried at 100° C. for 2 hours.
(2) For Treatment of AL160SG-1
One kilogram of AL160SG-1 was introduced into a blender, and while stirring it, 42.0 g of KBE3063 was added slowly. The mixture was stirred for 15 minutes, left to stand for 1 day, and then dried at 100° C. for 2 hours.

The method of composition preparation and the preparation method were carried out in the same manner as in Examples 10 to 12 and Comparative Examples 10 to 15 of Table 3.

The parameters and the results of Comparative Examples 31 to 34 are presented in Table 7 together with those of Examples 10 to 12 for comparison.

TABLE 7

|  | Ex. 10 | Ex. 11 | Ex. 12 | Comp. Ex. 31 | Comp. Ex. 32 | Comp. Ex. 33 | Comp. Ex. 34 |
| --- | --- | --- | --- | --- | --- | --- | --- |
| Polyisobutylene (EP200A) | 33.3 | 33.3 | 33.3 | 33.3 | 33.3 | 33.3 | 33.3 |
| Plasticizer PAO-5010 | 60 | 60 | 60 | 60 | 60 | 60 | 60 |
| Crosslinking agent CR300 | 6.7 | 6.7 | 6.7 | 6.7 | 6.7 | 6.7 | 6.7 |
| Smaller-diameter powder (AL160SG-1): dry method 1 | 100 | 200 | 50 | 25 | — | — | — |
| Smaller-diameter powder (AL43L): dry method 1 | 100 | 200 | 50 | 25 | — | — | — |
| Smaller-diameter powder (AL160SG-1): no treatment | — | — | — | — | — | — | — |
| Smaller-diameter powder (AL43L): no treatment | — | — | — | — | — | — | — |
| Smaller-diameter powder (AL160SG-1): dry method 3 | — | — | — | — | 100 | 200 | 50 |
| Smaller-diameter powder (AL43L): dry method 3 | — | — | — | — | 100 | 200 | 50 |
| AW50-74: no treatment | 400 | 400 | 700 | 750 | 400 | 400 | 700 |
| AW50-74: dry method 2 | — | — | — | — | — | — | — |
| Iron oxide | 4 | 4 | 4 | 4 | 4 | 4 | 4 |
| Platinum catalyst | 0.44 | 0.44 | 0.44 | 0.44 | 0.44 | 0.44 | 0.44 |
| Retardant | 0.16 | 0.16 | 0.16 | 0.16 | 0.16 | 0.16 | 0.16 |
| Hardness | 40 | 45 | 65 | 63 | 38 | 42 | 58 |
| Proportion (%) | 2.8 | 1.4 | 9.1 | 17.6 | 2.8 | 1.4 | 9.1 |
| Plasticity | 235 | 750 | 624 | 620 | 210 | 721 | 601 |
| Thermal conductivity (W/m · K) | 1.6 | 2.2 | 2.3 | 1.8 | 1.6 | 2.1 | 2.2 |
| Amount of volatilized gas ($\mu g/cm^2$) | 3.0 | 3.5 | 0.9 | 0.4 | 6.1 | 7.2 | 2.1 |
| Amount of volatilized low-molecular siloxane ($\mu g/cm^2$) | 0 | 0 | 0 | 0 | 0 | 0 | 0 |

Comparative Example 31 of Table 7 was for an investigation of a case where the proportion exceeded 10. A comparison of Comparative Example 31 and Examples 11 and 12 reveals that 800 parts by mass of thermally conductive inorganic powder was added to 100 parts by mass of polymer component. As can be understood from the comparison, the thermal conductivity was lowered by merely increasing the amount of larger-diameter thermally conductive inorganic powder.

Moreover, in contrast to Examples 10 to 12, Comparative Examples 32 to 34 were examples where smaller-diameter thermally conductive inorganic powders whose surface had been treated with a silane used in an amount twice as much as the calculated amount with which the entire surface of the smaller-diameter inorganic powders can be coated. Since a silane was present in an amount larger than the amount sufficient to coat the entire surface area of the smaller-diameter thermally conductive inorganic powders, the excessive silane was reflected in the amount of volatilized gas, and thus it was not preferable.

Examples 25 to 33 and Comparative Examples 35-40

Below, a description will be provided referring to Examples where a two-component, room-temperature curing silicone rubber was used.

1. Materials
(1) Silicone Component

A two-component, room-temperature curing silicone rubber (two-component RTV), namely SE1885 (trade name, manufactured by Dow Corning Toray Co., Ltd.), was used as a silicone component. Note that the SE1885 originally contains a platinum catalyst and a curing agent.

(2) Smaller-Diameter Thermally Conductive Inorganic Powder

A powder as described in item (3) in the "materials" section provided at the beginning of the Examples was used.

(3) Larger-Diameter Thermally Conductive Inorganic Powder

A powder as described in item (4) in the "materials" section provided at the beginning of the Examples was used.

(4) Silane

A silane as described in item (5) in the "materials" section provided at the beginning of the Examples was used.

(5) Silane Treatment of Smaller-Diameter Thermally Conductive Inorganic Powder

A treatment was performed in the same manner as in item (6) in the "materials" section provided at the beginning of the Examples.

(6) Method of Sheet Formation and Processing

A metal frame was placed on a polyester film having a thickness of 2 mm that had undergone a fluorine mold release treatment and a composition was poured into it. Another polyester film that had undergone a fluorine mold release treatment was placed over it. This was cured under a pressure of 5 MPa at 120° C. for 10 minutes.

The thermal conductivity, the hardness, and the amount of volatilized gas in the aforementioned Examples and Comparative Examples are presented in Tables 8 and 9. In Tables 8 and 9, the proportions were calculated according to the formula (A) above.

Methods of measuring physical properties were as follows.
Thermal conductivity: hot disk method (Kyoto Electronics Manufacturing Co., Ltd.)
Hardness: ASTM D2240 Shore 00
Amount of volatilized gas: headspace method using a gas chromatograph The amount of volatilized gas refers to the amount of KBE3063 remaining in the sheet.

Formulations for Examples 25 to 33 were as shown in Table 8 and formulations for Comparative Examples 35 to 40 were as shown in Table 9, and the results are presented also in Tables 8 and 9.

thermally conductive inorganic powder did not result in greatly different physical properties, namely hardness and thermal conductivity. However, as is clear from Table 9, the integral blending method (Comparative Examples 38 to 40) resulted in large amounts of volatilized gas.

Examples 34 to 36 and Comparative Examples 41 to 43

Next, experiments were carried out as Examples 34 to 36 where two or more types of smaller-diameter thermally conductive inorganic powders were combined. In addition to AL43L (trade name, manufactured by Showa Denko K. K., specific surface area of 3.2 m$^2$/g) and AS10 (trade name, manufactured by Showa Denko K. K., specific surface area of

TABLE 8

|  | Ex. 25 | Ex. 26 | Ex. 27 | Ex. 28 | Ex. 29 | Ex. 30 | Ex. 31 | Ex. 32 | Ex. 33 |
|---|---|---|---|---|---|---|---|---|---|
| Silicone component (SE1885) | 100 | 100 | 100 | 100 | 100 | 100 | 100 | 100 | 100 |
| Smaller-diameter powder (AL43L): dry method 1 | 150 | 250 | 300 | — | — | — | — | — | — |
| Smaller-diameter powder (AL43L): dry method 2 | — | — | — | 150 | 250 | 300 | — | — | — |
| Smaller-diameter powder (AL43L): wet method | — | — | — | — | — | — | 150 | 250 | 300 |
| Larger-diameter powder (AS10) | 100 | 100 | 200 | 100 | 100 | 200 | 100 | 100 | 200 |
| Coloring agent (iron oxide) | 5 | 5 | 5 | 5 | 5 | 5 | 5 | 5 | 5 |
| Hardness | 5 | 23 | 42 | 4 | 23 | 42 | 4 | 22 | 40 |
| Proportion (%)*[1] | 9.4 | 5.9 | 9.4 | 9.4 | 5.9 | 9.4 | 9.4 | 5.9 | 9.4 |
| Thermal conductivity (W/m·K) | 1.1 | 1.3 | 1.9 | 1.1 | 1.3 | 1.9 | 1.1 | 1.3 | 1.9 |
| Amount of volatilized gas (μg/cm$^2$) | 1.3 | 1.0 | 0.7 | 0.5 | 0.4 | 0.3 | 0.4 | 0.3 | 0.2 |

TABLE 9

|  | Comp. Ex. 35 | Comp. Ex. 36 | Comp. Ex. 37 | Comp. Ex. 38 | Comp. Ex. 39 | Comp. Ex. 40 |
|---|---|---|---|---|---|---|
| Silicone component (SE1885) | 100 | 100 | 100 | 100 | 100 | 100 |
| Smaller-diameter powder (AL43L): dry method 1 | — | — | — | — | — | — |
| Smaller-diameter powder (AL43L): dry method 2 | — | — | — | — | — | — |
| Smaller-diameter powder (AL43L): wet method | — | — | — | — | — | — |
| Larger-diameter powder (AS10) | 100 | 100 | 200 | 100 | 100 | 200 |
| Smaller-diameter powder (AL43L): no treatment | 150 | 250 | 300 | 150 | 250 | 300 |
| Coloring agent (iron oxide) | 5 | 5 | 5 | 5 | 5 | 5 |
| Hardness | 17 | 28 | 45 | 10 | 27 | 44 |
| Hexyltriethoxysilane (KBE3063) | — | — | — | 1.5 | 2.5 | 3.0 |
| Proportion (%) | 9.4 | 5.9 | 9.4 | 9.4 | 5.9 | 9.4 |
| Thermal conductivity (W/m·K) | 1.1 | 1.3 | 1.9 | 1.1 | 1.3 | 1.9 |
| Amount of volatilized gas (μg/cm$^2$) | 0 | 0 | 0 | 6.0 | 5.5 | 5.1 |

Table 8 collectively shows the difference of the surface treatment methods of the smaller-diameter thermally conductive inorganic powder and the results of the investigation of changing thermally conductive inorganic powders added to the silicone component. It can be said from Table 8 that different surface treatment methods for the smaller-diameter 0.5 m$^2$/g) as used in Examples 25 to 33, AL160SG-1 (trade name, manufactured by Showa Denko K. K., specific surface area of 6.6 m$^2$/g) and AW50-74 (trade name, manufactured by Micron Co., Ltd., specific surface area of 0.07 m$^2$/g) were used. The thermally conductive inorganic powder AL160SG-1 was treated according to the dry method (3)

described between Tables 6 and 7 above. The sheet formation was carried out according to the sheet forming and processing method (6) above.

The parameters for sample preparation and the results of Examples 34 to 36 and Comparative Examples 41 to 43 are presented in Table 10.

TABLE 10

|  | Ex. 34 | Ex. 35 | Ex. 36 | Comp. Ex. 41 | Comp. Ex. 42 | Comp. Ex. 43 |
|---|---|---|---|---|---|---|
| Silicone component (SE1885) | 100 | 100 | 100 | 100 | 100 | 100 |
| Smaller-diameter powder (AL160SG-1): dry method 1 | 100 | 200 | 50 | — | — | — |
| Smaller-diameter powder (AL43L): dry method 1 | 100 | 200 | 50 | — | — | — |
| Smaller-diameter powder (AL160SG-1): no treatment | — | — | — | 100 | 200 | 50 |
| Smaller-diameter powder (AL43L): no treatment | — | — | — | 100 | 200 | 50 |
| Larger-diameter powder (AW50-74) | 400 | 400 | 700 | 400 | 400 | 700 |
| Coloring agent (iron oxide) | 5 | 5 | 5 | 5 | 5 | 5 |
| Hardness | 41 | 60 | 75 | 35 | — | — |
| Proportion (%) | 2.8 | 1.4 | 9.1 | 2.8 | 1.4 | 9.1 |
| Thermal conductivity (W/m · K) | 1.9 | 2.6 | 2.4 | 1.9 | 2.6 | 2.4 |
| Amount of volatilized gas (μg/cm$^2$) | 3.3 | 4.0 | 1.2 | — | — | — |
| Remarks |  |  |  | cured insufficieintly | did not cure | did not cure |

As is clear from Table 10, rubbers cured invariably in Examples 34 to 36. This is possibly because the surface of the smaller-diameter thermally conductive inorganic powders coated with a silane compound prevented the platinum catalyst and the crosslinking agent from being adsorbed thereon. In addition, the higher the proportion of smaller-diameter thermally conductive inorganic powder loaded, the greater the amount of volatilized gas.

In contrast, Comparative Examples 41 to 43 showed that the greater the specific surface area of the smaller-diameter thermally conductive inorganic powders, the less likely the rubbers cured. In particular, in Comparative Examples 42 and 43, the rubbers did not cure. This is because the surface of the smaller-diameter thermally conductive inorganic powders adsorbed the platinum catalyst and the crosslinking agent.

Next, an investigation was carried out in which various silanes were used in the treatment of a smaller-diameter thermally conductive inorganic powder. Alumina AL43L (trade name, manufactured by Showa Denko K. K., specific surface area of 3.2 m$^2$/g) was used for a smaller-diameter thermally conductive inorganic powder.

The following silanes were used. The manufacturer thereof is all Dow Corning Toray Co., Ltd.
(1) Octyltriethoxysilane Z6341 (minimum coating area: 283 m$^2$/g)
(2) Decyltrimetoxysilane AY43-210MC (minimum coating area: 298 m$^2$/g)
(3) Octadecyltrimethoxysilane AY43-218MC (minimum coating area: 205 m$^2$/g)
(4) Methyltriethoxysilane SZ6072 (minimum coating area: 439 m$^2$/g)

The treatment method was carried out in the same manner as in the examples above (dry method 1) using the following formulations. One kilogram of AL43L was introduced into a blender, and while stirring it, a chemical prepared using the ingredients in the following amounts was added slowly. The mixture was stirred for 15 minutes, left to stand for 1 day, and then dried at 100° C. for 2 hours.

The details of the treatment with the aforementioned silanes are all presented in Table 11.

TABLE 11

| Type of silane | Necessary amount (g) | Isopropanol (g) | Water (g) |
|---|---|---|---|
| Octyltriethoxysilane | 11.3 | 20 | 5 |
| Decyltrimetoxysilane | 10.7 | 30 | 7.5 |
| Octadecyltrimethoxysilane | 15.6 | 40 | 10 |
| Methyltriethoxysilane | 7.3 | 10 | 3 |

Example 37

To 100 parts by mass of SE1885 were added 300 parts by mass of AL43L treated with octyltriethoxysilane according to dry method 1, 200 parts by mass of AS10, and 5 parts by mass of iron oxide, and stirred with a planetary mixer for 10 minutes while defoaming to yield a composition. This was subjected to a sheet forming process.

Example 38

To 100 parts by mass of SE1885 were added 400 parts by mass of AL43L treated with octyltriethoxysilane according to dry method 1, 100 parts by mass of AS10, and 5 parts by mass of iron oxide, and stirred with a planetary mixer for 10 minutes while defoaming to yield a composition. This was subjected to a sheet forming process.

Example 39

To 100 parts by mass of SE1885 were added 300 parts by mass of AL43L treated with decyltrimethoxysilane according to dry method 1, 200 parts by mass of AS10, and 5 parts by mass of iron oxide, and stirred with a planetary mixer for 10 minutes while defoaming to yield a composition. This was subjected to a sheet forming process.

Example 40

To 100 parts by mass of SE1885 were added 400 parts by mass of AL43L treated with decyltrimethoxysilane according to dry method 1, 100 parts by mass of AS10, and 5 parts by mass of iron oxide, and stirred with a planetary mixer for 10 minutes while defoaming to yield a composition. This was subjected to a sheet forming process.

Example 41

To 100 parts by mass of SE1885 were added 300 parts by mass of AL43L treated with octadecyltrimethoxysilane according to dry method 1, 200 parts by mass of AS10, and 5 parts by mass of iron oxide, and stirred with a planetary mixer for 10 minutes while defoaming to yield a composition. This was subjected to a sheet forming process.

Example 42

To 100 parts by mass of SE1885 were added 400 parts by mass of AL43L treated with octadecyltrimethoxysilane according to dry method 1, 100 parts by mass of AS10, and 5 parts by mass of iron oxide, and stirred with a planetary mixer for 10 minutes while defoaming to yield a composition. This was subjected to a sheet forming process.

Comparative Example 43

To 100 parts by mass of SE1885 were added 300 parts by mass of AL43L treated with methyltrimethoxysilane according to dry method 1, 200 parts by mass of AS10, and 5 parts by mass of iron oxide, and stirred with a planetary mixer for 10 minutes while defoaming to yield a composition. This was subjected to a sheet forming process.

Comparative Example 44

To 100 parts by mass of SE1885 were added 400 parts by mass of AL43L treated with methyltrimethoxysilane according to dry method 1, 100 parts by mass of AS10, and 5 parts by mass of iron oxide, and stirred with a planetary mixer for 10 minutes while defoaming to yield a composition. This was subjected to a sheet forming process.

Comparative Example 45

To 100 parts by mass of SE1885 were added 300 parts by mass of untreated AL43L, 200 parts by mass of AS10, and 5 parts by mass of iron oxide, and stirred with a planetary mixer for 10 minutes while defoaming to yield a composition. This was subjected to a sheet forming process.

Comparative Example 46

To 100 parts by mass of SE1885 were added 400 parts by mass of untreated AL43L, 100 parts by mass of AS10, and 5 parts by mass of iron oxide, and stirred with a planetary mixer for 10 minutes while defoaming to yield a composition. This was subjected to a sheet forming process.

The hardness as presented in Table 12 was tested as follows. Using Example 37 as an example, the test was carried out as follows. Examples 38 to 42 and Comparative Examples 44 to 47 were also carried out in the same manner.

To 100 parts by mass of fluid A of SE1885 were added 300 parts by mass of AL43L treated with octyltriethoxysilane according to dry method 1, 200 parts by mass of untreated AS10, and 5 parts by mass of iron oxide, and stirred with a planetary mixer for 5 minutes while defoaming to yield fluid composition A. Similarly, to 100 parts by mass of fluid B of SE1885 were added 300 parts by mass of AL43L treated with octyltriethoxysilane according to dry method 1, 200 parts by mass of untreated AS10, and 5 parts by mass of iron oxide, and stirred with a planetary mixer for 10 minutes while defoaming to yield fluid composition B. Immediately thereafter, the fluid composition A and the fluid composition B were stirred with a planetary mixer for 5 minutes in a ratio of 1:1 while defoaming to yield a composition that then was subjected to sheet forming. The hardness of this rubber sheet was measured. This was regarded as the initial hardness.

After storing another fluid composition A and another fluid composition B separately for one week at room temperature, the fluid composition A and the fluid composition B were stirred with a planetary mixer for 10 minutes in a ratio of 1:1 while defoaming to yield a composition that was then subjected to sheet forming. The hardness of this rubber sheet was measured. This was regarded as the one-week hardness.

The parameters and the results of Examples 37 to 42 and Comparative Examples 44 to 47 are presented together in Table 12.

TABLE 12

| | Ex. 37 | Ex. 38 | Ex. 39 | Ex. 40 | Ex. 41 | Ex. 42 | Comp. Ex. 44 | Comp. Ex. 45 | Comp. Ex. 46 | Comp. Ex. 47 |
|---|---|---|---|---|---|---|---|---|---|---|
| Treatment agent | Octyltriethoxysilane | | Decyltrimethoxysilane | | Octadecyltrimethoxysilane | | Methyltriethoxysilane | | — | |
| Silicone component (SE1885) | 100 | 100 | 100 | 100 | 100 | 100 | 100 | 100 | 100 | 100 |
| Smaller-diameter powder (AL43L): dry method 1 | 300 | 400 | 300 | 400 | 300 | 400 | 300 | 400 | — | — |
| Smaller-diameter powder (AL43L): no treatment | — | — | — | — | — | — | — | — | 300 | 400 |
| Larger-diameter powder (AS-10) | 200 | 100 | 200 | 100 | 200 | 100 | 200 | 100 | 200 | 100 |
| Coloring agent (iron oxide) | 5 | 5 | 5 | 5 | 5 | 5 | 5 | 5 | 5 | 5 |
| Hardness | 40 | 43 | 40 | 41 | 38 | 39 | 45 | 47 | 45 | 45 |
| Proportion (%) | 9.4 | 3.8 | 9.4 | 3.8 | 9.4 | 3.8 | 9.4 | 3.8 | 9.4 | 3.8 |
| Thermal conductivity (W/m·K) | 1.9 | 2.1 | 1.9 | 2.1 | 1.9 | 2.1 | 1.9 | 2.1 | 1.9 | 2.1 |
| Amount of volatilized gas (μg/cm$^2$) | 0.8 | 1.0 | 0.8 | 0.9 | — | — | 0.8 | 1.0 | 0 | 0 |

TABLE 12-continued

|  |  | Ex. 37 | Ex. 38 | Ex. 39 | Ex. 40 | Ex. 41 | Ex. 42 | Comp. Ex. 44 | Comp. Ex. 45 | Comp. Ex. 46 | Comp. Ex. 47 |
|---|---|---|---|---|---|---|---|---|---|---|---|
| Remarks |  |  |  |  |  | Could not be detected |  |  |  |  |  |
| Storability | Initial hardness | 40 | 43 | 40 | 41 | 38 | 39 | 45 | 47 | 45 | 45 |
|  | One-week hardness | 40 | 42 | 40 | 40 | 41 | 38 | 40 | 40 | 35 | 32 |

As is clear from Table 12, the hardness tended to be lowered as the number of carbon atoms of the silane treatment agent for the thermally conductive inorganic powder was increased. This is probably because the compatibility with the silicone component was enhanced. Moreover, the storability was enhanced by the treatment with a silane having a large number of carbon atoms. While the difference between the initial hardness and the one-week hardness in Examples 37 to 42 was 0 to 1, the difference between the initial hardness and the one-week hardness in Comparative Examples 44 to 47 was 5 to 13, and the storability was enhanced by the treatment with a silane having a large number of carbon atoms.

Comparative Examples 48 and 49

Experiments were carried out as Comparative Examples in which a surface-treated larger-diameter inorganic powder was used. AS10 (trade name, manufactured by Showa Denko K. K., specific surface area of 0.5 m²/g) or AW50-74 (trade name, manufactured by Micron Co., Ltd., specific surface area of 0.07 m²/g) was used as a larger-diameter thermally conductive inorganic powder, and hexyltriethoxysilane KBE3063 (trade name, manufactured by Shin-Etsu Chemical Co., Ltd.) was used as a silane. The amount of KBE3063 necessary in relation to each larger-diameter inorganic powder was the same as the amount stated in connection with item (5) in the "materials" section provided at the beginning of the Examples.

The larger-diameter thermally conductive inorganic powders both were treated in the same manner as in item (5) in the "materials" section provided at the beginning of the Examples.

The parameters and the results of Comparative Examples 48 and 49 are presented in Table 13 together with those of Examples 27 and 35.

TABLE 13

|  | Ex. 27 | Ex. 35 | Comp. Ex. 37 | Comp. Ex. 39 | Comp. Ex. 48 | Comp. Ex. 49 |
|---|---|---|---|---|---|---|
| Silicone component (SE1885) | 100 | 100 | 100 | 100 | 100 | 100 |
| Smaller-diameter powder (AL160SG-1): dry method 1 |  | 200 |  |  | 100 | 200 |
| Smaller-diameter powder (AL43L): dry method 1 | 300 | 200 |  |  | 300 | 200 |
| Smaller-diameter powder (AL160SG-1): no treatment |  |  |  | 200 |  |  |
| Smaller-diameter powder (AL43L): no treatment |  |  | 300 | 200 |  |  |
| Larger-diameter powder (AW50-74) |  | 400 |  | 400 |  |  |
| Larger-diameter powder (AS-10) | 200 |  | 200 |  |  |  |
| Larger-diameter powder (AW50-74): dry method 2 |  |  |  |  | 200 |  |
| Larger-diameter powder (AS-10): dry method 2 |  |  |  |  |  | 400 |
| Coloring agent (iron oxide) | 5 | 5 | 5 | 5 | 5 | 5 |
| Hardness | 42 | 60 | 45 | — | 42 | 60 |
| Thermal conductivity (W/m · K) | 1.9 | 2.6 | 1.9 | — | 1.9 | 2.6 |
| Storability Initial hardness | 42 | 60 | 45 | — | 42 | 60 |
| One-week hardness | 41 | 58 | 35 | — | 42 | 60 |

The hardness as presented in Table 13 was tested as follows. Using Example 27 as an example, the test was carried out as follows. Example 35 and Comparative Examples 37, 48, and 49 were also carried out in the same manner.

To 100 parts by mass of fluid A of SE1885 were added 300 parts by mass of AL43L treated according to dry method 1, 200 parts by mass of untreated AS10, and 5 parts by mass of iron oxide, and stirred with a planetary mixer for 5 minutes while defoaming to yield fluid composition A. Similarly, to 100 parts by mass of fluid B of SE1885 were added 300 parts by mass of AL43L treated according to dry method 1, 200 parts by mass of untreated AS10, and 5 parts by mass of iron oxide, and stirred with a planetary mixer for 10 minutes while defoaming to yield fluid composition B. Immediately thereafter, the fluid composition A and the fluid composition B were stirred with a planetary mixer for 5 minutes in a ratio of 1:1 while defoaming to yield a composition that then was subjected to sheet forming. The hardness of this rubber sheet was measured. This was regarded as the initial hardness.

After storing another fluid composition A and another fluid composition B separately for one week at room temperature, the fluid composition A and the fluid composition B were stirred with a planetary mixer for 10 minutes in a ratio of 1:1 while defoaming to yield a composition that then was subjected to sheet forming. The hardness of this rubber sheet was measured. This was regarded as the one-week hardness.

Compositions to which surface-treated smaller-diameter thermally conductive inorganic powders were added had a favorable storability. The difference between the initial hardness and the one-week hardness was small. A comparison of Example 27 with Comparative Example 37 reveals that while the difference between the initial hardness and the one-week hardness in Example 27 was 1, the difference between the initial hardness and the one-week hardness in Comparative Example 37 was 10, and the use of a smaller-diameter thermally conductive inorganic powder having a large specific surface area increased the difference between the initial hardness and the one-week hardness. The use of a surface-treated smaller-diameter thermal conduction inorganic powder having a large specific surface area decreased the difference between the initial hardness and the one-week hardness. That is, the storability was enhanced.

Moreover, the systems in which more smaller-diameter thermally conductive inorganic powders having large specific surface areas were used resulted in a more significant difference in hardness. There was a case where curing did not occur when an untreated smaller-diameter thermally conductive inorganic powder was used as demonstrated in Comparative Example 39. Example 27 is compared with Comparative Example 37 and Example 35 is compared with Comparative Example 39. Example 35 and Comparative Example 39 used a smaller-diameter thermally conductive inorganic powder that had a larger specific surface area than the powder used in Example 27 and Comparative Example 37. Therefore, initial curing did not even occur in Comparative Example 39, meaning that there was no storability.

Meanwhile, a treatment of not only the smaller-diameter thermally conductive inorganic powders but also the larger-diameter thermally conductive inorganic powders resulted in good storability. However, the one-week hardness was not lowered significantly relative to the initial hardness even if the treatment of the larger-diameter thermally conductive inorganic powders was not carried out. Example 27 is compared with Comparative Example 48 and Example 35 is compared with Comparative Example 49. In Comparative Examples 48 and 49, the surface of the larger-diameter thermally conductive inorganic powders also was treated. In contrast, the surface of the larger-diameter thermally conductive inorganic powders was not treated in Examples 27 and 35, but the hardness had the same value and the storability was at comparable levels.

Examples 43 and 44 and Comparative Examples 50 to 52

Next, an investigation was carried out using a millable silicone rubber as a silicone component.

TSE201 (trade name, manufactured by Momentive Performance Materials Inc.) and SH8311CVU (trade name, manufactured by Dow Corning Toray Co., Ltd.) were used as millable silicone rubbers.

Alumina AO502 (trade name, manufactured by Admafine, specific surface area of 7.5 m$^2$/g) was used as a smaller-diameter thermally conductive inorganic powder, Alumina AS20 (trade name, manufactured by Showa Denko K. K., specific surface area of 0.8 m$^2$/g) was used as a larger-diameter thermally conductive inorganic powder, and hexyltrimethoxysilane KBE3063 (trade name, manufactured by Shin-Etsu Chemical Co., Ltd.) was used as a silane for the treatment of the respective powders.

The necessary amount for the treatment of a smaller-diameter thermally conductive inorganic powder was calculated according to the formula: Necessary amount of "KBE3063"=Amount of thermally conductive inorganic powder (g)×Specific surface area of thermally conductive inorganic powder (m$^2$/g)/Minimum silane coating area (m$^2$/g). The minimum "KBE3063" coating area was 315 m$^2$/g, and thus 1000 g×7.5 m$^2$/g/315 m$^2$/g=23.8 g.

The small-diameter thermally conductive inorganic powder AL43L was treated in the same manner as in item (6) in the "materials" section provided at the beginning of the Examples.

The larger-diameter thermally conductive inorganic powder AS20 (specific surface area of 0.8 m$^2$/g) was also provided. In this case, the necessary amount of KBE3063 was 2.5 g. The larger-diameter thermally conductive inorganic powder was treated as follows. TC-25A (trade name, manufactured by Momentive Performance Materials Inc.) was used as a platinum catalyst. TC-25B (trade name, manufactured by Momentive Performance Materials Inc.) was used as a crosslinking agent.

For AS20: 1 kg of AS20 was introduced into a blender, and while stirring it, a chemical in which 2.5 g of KBE3063, 10 g of isopropanol, and 0.5 g of water were mixed was added slowly. The mixture was stirred for 15 minutes, left to stand for 1 day, and then dried at 100° C. for 2 hours.

(Method of Sheet Formation)

A metal frame was placed on a polyester film having a thickness of 2 mm that had undergone a fluorine mold release treatment and a composition was poured into it. Another polyester film that had undergone a fluorine mold release treatment was placed over it. This was cured under a pressure of 5 MPa at 170° C. for 10 minutes and further heat-treated at 200° C. for 4 hours in an oven.

The parameters and the results of Examples 43 and 44 and Comparative Examples 50 to 52 are presented in Table 14.

TABLE 14

|  | Ex. 43 | Ex. 44 | Comp. Ex. 50 | Comp. Ex. 51 | Comp. Ex. 52 |
| --- | --- | --- | --- | --- | --- |
| Silicone component (TSE201) | 50 | 50 | 50 | 50 | 50 |
| Silicone component (SH8311CVU) | 45 | 45 | 45 | 45 | 45 |
| Larger-diameter powder (AS20): dry method 2 | | | | | |
| Smaller-diameter powder (SO502): dry method 2 | 200 | 200 | | | 100 |

TABLE 14-continued

|  | Ex. 43 | Ex. 44 | Comp. Ex. 50 | Comp. Ex. 51 | Comp. Ex. 52 |
|---|---|---|---|---|---|
| Larger-diameter powder (AS20): no treatment | 100 | 200 | 100 | 200 | 200 |
| Smaller-diameter powder (AO502): no treatment |  |  | 200 | 200 |  |
| Vulcanizing agent (TC-25A) |  |  |  |  |  |
| Crosslinking agent (TC-25B) | 1 | 1 | 1 | 1 | 1 |
| Hardness | 5 | 5 | 5 | 5 | 5 |
| Proportion (%) | 55 | 58 | — | — | 58 |
| Thermal conductivity (W/m · K) | 5.1 | 9.6 | 5.1 | 9.6 | 17.6 |
| Amount of volatilized gas (μg/cm$^2$) | 0.8 | 1.2 | — | — | 0.7 |
| Remarks | 0 | 0 | Unloadable | Unloadable | 0 |

The physical properties presented in Table 14 were measured according to the following methods.
(1) Thermal conductivity: hot disk method (Kyoto Electronics Manufacturing Co., Ltd.)
(2) Hardness: ASTM D2240 Shore A
(3) Amount of volatilized gas: headspace method using a gas chromatograph As is clear from Table 14, in the systems where millable silicone rubbers were used as silicone components, the smaller-diameter thermally conductive inorganic powder could not even be loaded without a surface treatment. In Comparative Example 52, the proportion exceeded 10. Exceeding 10 means that the amount of larger-diameter inorganic powder loaded into the silicones was large. To enhance the thermal conductivity, it is preferable to allow smaller-diameter inorganic powder particles to enter between larger-diameter inorganic powder particles, and in Comparative Example 52 the thermal conductivity was as low as 0.7 W/m-K despite the amount of powder loaded into the silicones being the same as in Example 43.

Comparative Example 53

Fifty parts by mass of TSE201 and 45 parts by mass of SH8311CVU were roughly kneaded with a two-roller mill, and likewise 200 parts by mass of AO502 (trade name, manufactured by Admatechs Co., Ltd., specific surface area of 7.5 m$^2$/g, average particle diameter d50 according to laser diffraction scattering of 0.7 μm) treated according to dry method 2 and 100 parts by mass of AS20 (trade name, manufactured by Showa Denko K. K., specific surface area of 0.8 m$^2$/g, average particle diameter d50 according to laser diffraction scattering of 22 μm) treated according to dry method 2 were added and kneaded. In addition, 5 parts by mass of TC-25B was added and kneaded, and eventually 1 part by mass of TC-25A was added and kneaded to prepare a composition.

Comparative Example 54

Fifty parts by mass of TSE201 and 45 parts by mass of SH8311CVU were roughly kneaded with a two-roller mill, and likewise 200 parts by mass of AO502 treated according to dry method 2 and 200 parts by mass of AS20 treated according to dry method 2 were added and kneaded. In addition, 5 parts by mass of TC-25B was added and kneaded, and eventually 1 part by mass of TC-25A was added and kneaded to prepare a composition.

The parameters and the results of Comparative Examples 53 and 54 are presented in Table 15.

TABLE 15

|  | Comp. Ex. 53 | Comp. Ex. 54 |
|---|---|---|
| Silicone component (TSE201) | 50 | 50 |
| Silicone component (SH8311CVU) | 45 | 45 |
| Larger-diameter powder (AS20): dry method 2 | 100 | 200 |
| Smaller-diameter powder (AO502): dry method 2 | 200 | 200 |
| Larger-diameter powder (AS20): no treatment | — | — |
| Smaller-diameter powder (AO502): no treatment | — | — |
| Platinum catalyst (TC-25A) | 1 | 1 |
| Crosslinking agent (TC-25B) | 5 | 5 |
| Hardness | 53 | 56 |
| Proportion (%) | 5.1 | 9.6 |
| Thermal conductivity (W/m · K) | 0.8 | 1.2 |
| Amount of volatilized gas (μg/cm$^2$) | 0 | 0 |

According to Tables 14 and 15, the difference in hardness was small and the hardness was nearly identical regardless of whether the surface of the larger-diameter thermally conductive inorganic powders was treated (Comparative Examples 53 and 54) or not treated (Examples 43 and 44). The amount of volatilized gas was zero in all cases because secondary vulcanization was performed at 200° C. for 4 hours.

Examples 25 to 44 and Comparative Examples 35 to 54 demonstrated that the silane treatment of the smaller-diameter thermally conductive inorganic powder having a large specific surface area enhanced the loadability into the silicone components and the storability of the compositions, and reduced the amount of volatilized gas.

It was possible to produce a thermally conductive silicone composition that had a low hardness and a high thermal conductivity, barely produced volatilized gas derived from the surface treatment agent, and had storage stability merely by treating the surface of a smaller-diameter thermally conductive inorganic powder having a large specific surface area without treating the surface of a larger-diameter thermally conductive inorganic powder despite large amounts of thermally conductive inorganic powder being loaded into a silicone component.

Comparative Examples 55 to 58

Next, an investigation was carried out for a surface treatment that used a silane in an amount twice as much as the amount sufficient for coating the entire surface of smaller-diameter inorganic powders (AL43L and AL160SG-1). An investigation also was carried out for a case in which the value from the aforementioned formula (A) exceeded 10.
(Dry Method 3)
(1) For AL43L
One kilogram of AL43L was introduced into a blender, and while stirring it, 20.2 g of KBE3063 was added slowly. The mixture was stirred for 15 minutes, left to stand for 1 day, and then dried at 100° C. for 2 hours.
(2) For AL160SG-1
One kilogram of AL160SG-1 was introduced into a blender, and while stirring it, 42.0 g of KBE3063 was added slowly. The mixture was stirred for 15 minutes, left to stand for 1 day, and then dried at 100° C. for 2 hours.
Examples 35 and 36 of Table 16 are the same as those presented above.
The parameters and the results of Comparative Examples 55 to 58 are presented in Table 16 together with those of Examples 35 and 36 for comparison.

of the smaller-diameter thermally conductive inorganic powders, the excessive silane was reflected in the amount of volatilized gas.

Examples 45 to 53 and Comparative Examples 59 to 67

In the following Examples, polyethylene Novatec UJ480 (trade name, manufactured by Japan Polyethylene Corporation) was used as a resin component, AL43L (trade name, manufactured by Showa Denko K. K., specific surface area of 3.2 m$^2$/g) was used as a smaller-diameter thermally conductive inorganic powder, AS10 (trade name, manufactured by Showa Denko K. K., specific surface areas of 0.5 m$^2$/g) was used as a larger-diameter thermally conductive inorganic powder, and hexyltriethoxysilane KBE3063 (trade name, manufactured by Shin-Etsu Chemical Co., Ltd.) was used as a silane. The amount of KBE3063 was the same as in item (5) in the "materials" section provided at the beginning of the Examples. The small-diameter thermally conductive inorganic powder was treated in the same manner as in item (6) in the "materials" section provided at the beginning of the Examples.
The larger-diameter thermally conductive inorganic powder was treated in the same manner as in item (7) in the "materials" section provided at the beginning of the Examples.

TABLE 16

| | | Ex. 35 | Ex. 36 | Comp. Ex. 55 | Comp. Ex. 56 | Comp. Ex. 57 | Comp. Ex. 58 |
|---|---|---|---|---|---|---|---|
| SE1885 | | 100 | 100 | 100 | 100 | 100 | 100 |
| AL160SG-1: dry method 1 | | 200 | 50 | 25 | — | — | — |
| AL43L: dry method 1 | | 200 | 50 | 25 | — | — | — |
| AL160SG-1: dry method 3 | | — | — | — | 200 | 50 | — |
| AL43L: dry method 3 | | — | — | — | 200 | 50 | — |
| AW50-74 | | 400 | 700 | 750 | 400 | 700 | 800 |
| AS10: dry method 2 | | — | — | — | — | — | — |
| Iron oxide | | 5 | 5 | 5 | 5 | 5 | 5 |
| Hardness | | 60 | 75 | 85 | 55 | 72 | 85 |
| Proportion (%) | | 1.4 | 9.1 | 17.6 | 1.4 | 9.1 | 100 |
| Thermal conductivity (W/m · K) | | 2.6 | 2.4 | 2.1 | 2.5 | 2.1 | 1.8 |
| Amount of volatilized gas (μg/cm$^2$) | | 4.0 | 1.2 | 0.6 | 11.3 | 5.1 | 0 |
| Storability | Initial hardness | 60 | 75 | 85 | 55 | 72 | 85 |
| | One-week hardness | 58 | 72 | 80 | 53 | 71 | 80 |

Comparative Example 55 of Table 16 was for an investigation of a case where the proportion exceeded 10. A review of Examples 35, 36, Comparative Examples 55, and 58 shows that 800 parts by mass of thermally conductive inorganic powder was added to 100 parts by mass of silicone. As can be understood, the thermal conductivity was lowered by merely increasing the amount of larger-diameter thermally conductive inorganic powder. Comparative Examples 56 and 57 were examples where smaller-diameter thermally conductive inorganic powders whose surface had been treated with a silane used in an amount twice as much as the amount that is sufficient to coat the entire surface of the smaller-diameter inorganic powders. Since a silane was present in an amount larger than the amount sufficient to coat the entire surface area The integral method was performed in Comparative Examples 62 to 64 as shown in Table 18, and the necessary amount of KBE3063 was added during the composition preparation.
(Method of Composition Preparation)
The polyethylene was kneaded roughly with a biaxial roller for 1 minute while heating it at 90° C., and the thermally conductive inorganic powder was introduced thereinto and kneaded with biaxial rollers for 5 minutes to yield a composition.
(Method of Sheet Formation)
A metal frame was placed on a polyester film having a thickness of 2 mm that had undergone a fluorine mold release treatment and a composition was poured into it. Another polyester film that had undergone a fluorine mold release treatment was placed over it. This was heated under a pressure of 5 MPa at 120° C. for 10 minutes and then cooled to yield a thermally conductive resin composition.

The proportion was calculated according to the formula (A) above.

Methods of measuring physical properties were as follows:
Thermal conductivity: hot disk method (Kyoto Electronics Manufacturing Co., Ltd.)
Hardness: ASTM D2240 Shore D
Amount of volatilized gas: headspace method using a gas chromatograph
Fluidity: A sample having a thickness of 2.0 mm and a diameter of 13 mm was prepared, the sample was placed on a heater maintained at 150° C., a 500 g weight heated to 150° C. was placed thereon, and the thickness after 10 minutes was measured. A smaller thickness indicates a greater fluidity.

First, investigations were carried out for the difference of methods of treating the surface of a thermally conductive inorganic powder, the presence or absence of the processing on a smaller-diameter thermally conductive inorganic powder, and the use of a treated larger-diameter thermally conductive inorganic powder. Compositions were prepared using the formulations presented in Tables 17 and 18 and processed into sheets, and their physical properties were measured.

proportions of the smaller-diameter thermally conductive inorganic powder and the larger-diameter thermally conductive inorganic powder, the hardness and the thermal conductivity were not very different irrespective of the method of treating the smaller-diameter thermally conductive inorganic powder. In contrast, unless the smaller-diameter thermally conductive inorganic powder was treated, the hardness was increased. For fluidity, a significant effect was demonstrated by treating the smaller-diameter thermally conductive inorganic powder. As can be understood from a comparison of Examples 45 to 53 with Comparative Examples 62 to 64, the treatment of the smaller-diameter thermally conductive inorganic powder according to the integral blending method resulted in large amounts of volatilized gas. As can be understood from a comparison of Examples 45 to 53 with Comparative Examples 65 to 67, the hardness, the thermal conductivity, and the amount of volatilized gas of the rubbers in which the surface-treated larger-diameter thermally conductive inorganic powder was also added to the polymer component were nearly identical to those of the rubbers in which only the smaller-diameter thermally conductive inorganic powder was treated.

The surface treatment of only the smaller-diameter thermally conductive inorganic powder resulted in thermally con-

TABLE 17

|  | Ex. 45 | Ex. 46 | Ex. 47 | Ex. 48 | Ex. 49 | Ex. 50 | Ex. 51 | Ex. 52 | Ex. 53 |
|---|---|---|---|---|---|---|---|---|---|
| Polyethylene | 100 | 100 | 100 | 100 | 100 | 100 | 100 | 100 | 100 |
| AL43L: dry method 1 | 150 | 250 | 300 | | | | | | |
| AL43L: dry method 2 | | | | 150 | 250 | 300 | | | |
| AL43L: wet method | | | | | | | 150 | 250 | 300 |
| AS10 | 100 | 100 | 200 | 100 | 100 | 200 | 100 | 100 | 200 |
| AL43L: wet method | | | | | | | | | |
| AS10: dry method 2 | | | | | | | | | |
| Hardness | 55 | 60 | 62 | 55 | 60 | 62 | 56 | 60 | 61 |
| Fluidity mm | 0.41 | 0.56 | 0.73 | 0.40 | 0.53 | 0.74 | 0.40 | 0.57 | 0.73 |
| Proportion % | 9.4 | 5.9 | 9.4 | 9.4 | 5.9 | 9.4 | 9.4 | 5.9 | 9.4 |
| Thermal conductivity W/m · K | 1.7 | 2.1 | 3.2 | 1.7 | 2.1 | 3.2 | 1.7 | 2.1 | 3.2 |
| Amount of volatilized gas µg/cm$^2$ | 0.5 | 0.4 | 0.2 | 0.4 | 0.3 | 0.2 | 0.2 | 0.2 | 0.2 |

TABLE 18

|  | Comp. Ex. 59 | Comp. Ex. 60 | Comp. Ex. 61 | Comp. Ex. 62 | Comp. Ex. 63 | Comp. Ex. 64 | Comp. Ex. 65 | Comp. Ex. 66 | Comp. Ex. 67 |
|---|---|---|---|---|---|---|---|---|---|
| Polyethylene | 100 | 100 | 100 | 100 | 100 | 100 | 100 | 100 | 100 |
| AL43L: dry method 1 | | | | | | | | | |
| AL43L: dry method 2 | | | | | | | 150 | 250 | 300 |
| AL43L: wet method | | | | | | | | | |
| AS10 | 150 | 250 | 300 | 150 | 250 | 300 | | | |
| AL43L: no treatment | 100 | 100 | 200 | 100 | 100 | 200 | | | |
| AS10: dry method 2 | | | | | | | 100 | 100 | 200 |
| KBE-3063 | | | | 1.5 | 2.5 | 3.0 | | | |
| Hardness | 58 | 63 | 68 | 57 | 63 | 67 | 56 | 61 | 65 |
| Fluidity mm | 0.55 | 0.94 | 1.51 | 0.55 | 0.70 | 0.85 | 0.38 | 0.52 | 0.70 |
| Proportion % | 9.4 | 5.9 | 9.4 | 9.4 | 5.9 | 9.4 | 9.4 | 5.9 | 9.4 |
| Thermal conductivity W/m · K | 1.7 | 2.1 | 3.2 | 1.7 | 2.1 | 3.2 | 1.7 | 2.1 | 3.2 |
| Amount of volatilized gas µg/cm$^2$ | 0 | 0 | 0 | 0.6 | 0.8 | 0.7 | 0.6 | 0.4 | 0.2 |

A comparison of Examples 45 to 53 of Table 17 with Comparative Examples 59 to 61 of Table 18 reveals that, as a result of changing the methods of treating the smaller-diameter thermally conductive inorganic powder and changing the ductive polymer compositions that had a low hardness and a favorable fluidity (high processability) and that produced little volatilized gas without the surface treatment of the larger-diameter thermally conductive inorganic powder.

Examples 54 to 56 and Comparative Examples 68 to 73

Investigations were carried out for the presence or absence of the processing on smaller-diameter thermally conductive inorganic powders and the use of a treated larger-diameter thermally conductive inorganic powder as in Tables 17 and 18. Experiments, however, were carried out using a mixture of two or more types of smaller-diameter thermally conductive inorganic powders.

In addition to the aforementioned alumina, AL160SG-1 having a specific surface area of 6.6 $m^2/g$ (manufactured by Showa Denko K. K.) and AW50-74 having a specific surface area of 0.07 $m^2/g$ (manufactured by Micron Co., Ltd.) were used. The thermally conductive inorganic powder AL160SG-1 was treated according to dry method 3 described after Table 3 above, and AW50-74 was treated in the same manner as in item (7) in the "materials" section provided at the beginning of the Examples.

The parameters and the results of the above treatments are presented in Table 19. The description of the proportions and the physical properties is as presented above.

ins Co. Ltd.), curing agent: Amicure MY-H (trade name, manufactured by Ajinomoto Fine-Techno Co.). A small-diameter thermally conductive inorganic powder was subjected to the following treatments. The treatments were identical to those carried out on the thermally conductive inorganic powders used in Example 45 of Table 17 to Example 56 and Comparative Examples 59 to 73 of Table 19.

(Method of Composition Preparation)

A thermally conductive inorganic powder was introduced into an epoxy resin in a planetary mixer and kneaded for 10 minutes at room temperature. A curing agent was introduced, and kneading was performed for 5 more minutes to yield a composition.

(Method of Sheet Formation)

A metal frame was placed on a polyester film having a thickness of 2 mm that had undergone a fluorine mold release treatment and a composition was poured into it. Another polyester film that had undergone a fluorine mold release treatment was placed over it. This was heated under a pressure of 5 MPa at 120° C. for 45 minutes and then cooled to yield a thermally conductive resin composition.

TABLE 19

|  | Ex. 54 | Ex. 55 | Ex. 56 | Comp. Ex. 68 | Comp. Ex. 69 | Comp. Ex. 70 | Comp. Ex. 71 | Comp. Ex. 72 | Comp. Ex. 73 |
|---|---|---|---|---|---|---|---|---|---|
| Polyethylene | 100 | 100 | 100 | 100 | 100 | 100 | 100 | 100 | 100 |
| AL160SG-1: dry method 1 | 100 | 200 | 50 |  |  |  | 100 | 200 | 50 |
| AL43L: dry method 1 | 100 | 200 | 50 |  |  |  | 100 | 200 | 50 |
| AL160SG-1: no treatment |  |  |  | 100 | 200 | 50 |  |  |  |
| AL43L: no treatment |  |  |  | 100 | 200 | 50 |  |  |  |
| AW50-74: no treatment | 400 | 400 | 700 | 400 | 400 | 700 |  |  |  |
| AW50-74: dry method 2 |  |  |  |  |  |  | 400 | 400 | 700 |
| Hardness | 62 | 67 | 58 | 65 | 70 | 62 | 62 | 65 | 58 |
| Proportion % | 2.8 | 1.4 | 9.1 | 2.8 | 1.4 | 9.1 | 2.8 | 1.4 | 9.1 |
| Fluidity mm | 0.71 | 0.82 | 0.97 | 1.75 | 2.00 | 2.00 | 0.69 | 0.80 | 0.85 |
| Thermal conductivity W/m · K | 3.2 | 4.1 | 4.5 | 3.2 | 4.1 | 4.5 | 3.2 | 4.1 | 4.5 |
| Amount of volatilized gas µg/$cm^2$ | 0.5 | 0.5 | 0.5 | 0 | 0 | 0 | 0.5 | 0.5 | 0.5 |

According to Table 19, the silane treatment of the smaller-diameter thermally conductive inorganic powders having large specific surface areas resulted in a reduced hardness. This shows that the silane treatment of the smaller-diameter thermally conductive inorganic powders allowed the thermally conductive inorganic powders to be loaded readily into the resin. Moreover, it can be understood that, without treating the surface of the larger-diameter thermally conductive inorganic powder, the hardness was reduced merely by the surface treatment of the smaller-diameter thermally conductive inorganic powders having large specific surface areas. For fluidity, a significant effect was demonstrated by treating the smaller-diameter thermally conductive inorganic powders. The amount of volatilized gas were similar irrespective of the surface treatment of the larger-diameter thermally conductive inorganic powder.

Examples 57-65 and Comparative Examples 74-82

The same experiments as above were carried out using a different resin component. Resin component: epoxy resin Epicoat 825 (trade name, manufactured by Japan Epoxy Res- The methods of measuring physical properties were as follows:

Thermal conductivity: hot disk method (Kyoto Electronics Manufacturing Co., Ltd.)

Hardness: ASTM D2240 Shore D

Amount of volatilized gas: headspace method using a gas chromatograph

Viscosity (viscosity of composition before curing): measurement using a precision rotational viscometer First, investigations were carried out for the difference of methods of treating the surface of thermally conductive inorganic powders, the presence or absence of the processing on a smaller-diameter thermally conductive inorganic powder, and the use of a treated larger-diameter thermally conductive inorganic powder. Compositions were prepared using the formulations presented in Tables 20 and 21 and processed into sheets, and their physical properties were measured. The proportions were calculated according to the formula (A) above.

TABLE 20

|  | Ex. 57 | Ex. 58 | Ex. 59 | Ex. 60 | Ex. 61 | Ex. 62 | Ex. 63 | Ex. 64 | Ex. 65 |
|---|---|---|---|---|---|---|---|---|---|
| Epicoat 825 | 100 | 100 | 100 | 100 | 100 | 100 | 100 | 100 | 100 |
| Amicure MY-H | 30 | 30 | 30 | 30 | 30 | 30 | 30 | 30 | 30 |
| AL43L: dry method 1 | 150 | 250 | 300 | | | | | | |
| AL43L: dry method 2 | | | | 150 | 250 | 300 | | | |
| AL43L: wet method | | | | | | | 150 | 250 | 300 |
| AS10: no treatment | 100 | 100 | 200 | 100 | 100 | 200 | 100 | 100 | 200 |
| AL43L: no treatment | | | | | | | | | |
| AS10: dry method 2 | | | | | | | | | |
| Hardness | 93 | 95 | 95 | 93 | 95 | 95 | 93 | 95 | 95 |
| Proportion % | 9.4 | 5.9 | 9.4 | 9.4 | 5.9 | 9.4 | 9.4 | 5.9 | 9.4 |
| Viscosity Pa · s | 98 | 703 | 3360 | 90 | 705 | 3500 | 85 | 750 | 3500 |
| Thermal conductivity W/m · K | 1.7 | 2.1 | 3.2 | 1.7 | 2.1 | 3.2 | 1.7 | 2.1 | 3.2 |
| Amount of volatilized gas μg/cm$^2$ | 0.6 | 0.4 | 0.2 | 0.3 | 0.3 | 0.2 | 0.2 | 0.2 | 0.2 |

TABLE 21

|  | Comp. Ex. 74 | Comp. Ex. 75 | Comp. Ex. 76 | Comp. Ex. 77 | Comp. Ex. 78 | Comp. Ex. 79 | Comp. Ex. 80 | Comp. Ex. 81 | Comp. Ex. 82 |
|---|---|---|---|---|---|---|---|---|---|
| Epicoat 825 | 100 | 100 | 100 | 100 | 100 | 100 | 100 | 100 | 100 |
| Amicure MY-H | 30 | 30 | 30 | 30 | 30 | 30 | 30 | 30 | 30 |
| AL43L: dry method 1 | | | | | | | | | |
| AL43L: dry method 2 | | | | | | | 150 | 250 | 300 |
| AL43L: wet method | | | | | | | | | |
| AS10: no treatment | 100 | 100 | 200 | 100 | 100 | 200 | | | |
| AL43L: no treatment | 150 | 250 | 300 | 150 | 250 | 300 | | | |
| AS10: dry method 2 | | | | | | | 100 | 100 | 200 |
| Hardness | 95 | 95 | 97 | 95 | 95 | 95 | 94 | 94 | 95 |
| KBE-3063 | | | | 1.5 | 2.5 | 3.0 | | | |
| Proportion % | 9.4 | 5.9 | 9.4 | 9.4 | 5.9 | 9.4 | 9.4 | 5.9 | 9.4 |
| Viscosity Pa · s | 850 | 13930 | — | 103 | 1025 | 5051 | 85 | 720 | 3010 |
| Thermal conductivity W/m · K | 1.7 | 2.1 | — | 1.7 | 2.1 | 3.2 | 1.7 | 2.1 | 3.2 |
| Amount of volatilized gas μg/cm$^2$ | 0 | 0 | — | 0.6 | 0.7 | 0.7 | 0.2 | 0.2 | 0.2 |
| Remarks | | | Unloadable | | | | | | |

Tables 20 and 21 show the difference of the surface treatment methods of the smaller-diameter thermally conductive inorganic powder, the presence or absence of the processing on the larger-diameter thermally conductive inorganic powder, and the results of the investigation of changing the proportions of the larger-diameter thermally conductive inorganic powder and the small-diameter thermally conductive inorganic powder added to the polymer component. It can be said from Tables 20 and 21 that different surface treatment methods for the smaller-diameter thermally conductive inorganic powder did not result in greatly different physical properties, namely hardness and thermal conductivity. Moreover, the surface treatment of only the smaller-diameter thermally conductive inorganic powder having a large specific surface area resulted in a thermally conductive polymer composition that had a reduced hardness and produced little volatilized gas even without treating the surface of the larger-diameter thermally conductive inorganic powder. The viscosity varied greatly between the system to which a surface-treated thermally conductive inorganic powder was added and the system to which a surface-treated thermally conductive inorganic powder was not added.

Examples 66 to 68 and Comparative Examples 83 to 88

The presence or absence of the processing on smaller-diameter thermally conductive inorganic powders and the use of a treated larger-diameter thermally conductive inorganic powder were investigated in the same manner as in Tables 20 and 21. However, experiments were carried out using a mixture of two or more types of smaller-diameter thermally conductive inorganic powders. In addition to the aforementioned alumina, AL160SG-1 having a specific surface area of 6.6 m$^2$/g (manufactured by Showa Denko K. K.) and AW50-74 having a specific surface area of 0.07 m$^2$/g (manufactured by Micron Co., Ltd.) were used. The treatment method of AL160SG-1 was dry method 3 described after Table 3 above, and the treatment method of AW50-74 was the item (7) in the "materials" section provided at the beginning of the Examples.

The sheet formation was performed as in Examples 57 to 65 and Comparative Examples 74 to 82. The parameters and the results are presented in Table 22.

TABLE 22

|  | Ex. 66 | Ex. 67 | Ex. 68 | Comp. Ex. 83 | Comp. Ex. 84 | Comp. Ex. 85 | Comp. Ex. 86 | Comp. Ex. 87 | Comp. Ex. 88 |
|---|---|---|---|---|---|---|---|---|---|
| Epicoat 825 | 100 | 100 | 100 | 100 | 100 | 100 | 100 | 100 | 100 |
| Amicure MY-H | 30 | 30 | 30 | 30 | 30 | 30 | 30 | 30 | 30 |
| AL160SG-1: dry method 1 | 100 | 200 | 50 |  |  |  | 100 | 200 | 50 |
| AL43L: dry method 1 | 100 | 200 | 50 |  |  |  | 100 | 200 | 50 |
| AL160SG-1: no treatment |  |  |  | 100 | 200 | 50 |  |  |  |
| AL43L: no treatment |  |  |  | 100 | 200 | 50 |  |  |  |
| AW50-74: no treatment | 400 | 400 | 700 | 400 | 400 | 700 |  |  |  |
| AW50-74: dry method 2 |  |  |  |  |  |  | 400 | 400 | 700 |
| Hardness | 97 | 97 | 98 | 99 | 99 | 99 | 98 | 98 | 98 |
| Proportion % | 2.8 | 1.4 | 9.1 | 2.8 | 1.4 | 9.1 | 2.8 | 1.4 | 9.1 |
| Viscosity Pa·s | 2589 | 7125 | 16725 | 7501 | — | — | 2514 | 7056 | 15222 |
| Thermal conductivity W/m·K | 3.2 | 4.1 | 4.5 | 3.2 | — | — | 3.2 | 4.1 | 4.5 |
| Amount of volatilized gas μg/cm² | 0.2 | 0.3 | 0.2 | 0 | — | — | 0.2 | 0.2 | 0.2 |
| Remarks |  |  |  |  |  |  |  |  |  |

According to Table 22, the surface treatment of the smaller-diameter thermally conductive inorganic powders having large specific surface areas resulted in compositions having dramatically lowered viscosities. This shows that the silane treatment of the smaller-diameter thermally conductive inorganic powders allowed the thermally conductive inorganic powders to be loaded readily into the polymer, indicating that the resin component readily incorporated the thermally conductive inorganic powders. Moreover, the surface treatment of only the smaller-diameter thermally conductive inorganic powders having large specific surface areas resulted in thermally conductive resin compositions of which the composition viscosity before curing was low and the amount of volatilized gas after curing was small without treating the surface of the larger-diameter thermally conductive inorganic powder.

Examples 45 to 68 and Comparative Examples 59 to 88 demonstrated that the silane treatment of a smaller-diameter thermally conductive inorganic powder having a large specific surface area lowers the composition viscosity or enhances the fluidity. This shows that the thermally conductive inorganic powder is loaded readily into a polymer, as well as the polymer readily incorporates the thermally conductive inorganic powder. In addition, the silane treatment of only a smaller-diameter thermally conductive inorganic powder can keep the amount of volatilized gas derived from the surface treatment agent small. In other words, without treating the surface of a larger-diameter thermally conductive inorganic powder, the composition viscosity is reduced or the fluidity is enhanced, i.e., processability is enhanced, merely by the surface treatment of a smaller-diameter thermally conductive inorganic powder having a large specific surface area. Furthermore, the resulting molded article or cured article is a thermally conductive resin composition that has a reduced hardness and produces little volatilized gas.

The invention claimed is:

1. A thermally conductive resin composition comprising:
    (a) a matrix component,
    (b) a larger-diameter thermally conductive inorganic powder having a specific surface area of 0.06 to 1.0 m²/g, and
    (c) a smaller-diameter thermally conductive inorganic powder having a pre-treatment specific surface area of greater than 1.0 to 20 m²/g,
    a surface of the small-diameter thermally conductive inorganic powder of the component (c) being treated with a silane compound represented by $R(CH_3)_a Si(OR')_{3-a}$, wherein R is an unsubstituted or substituted organic group having 6 to 20 carbon atoms, R' is an alkyl group having 1 to 4 carbon atoms, and a is 0 or 1, or a partially hydrolyzed product thereof, and an amount thereof being smaller than an amount necessary to coat an entire surface area of the smaller-diameter thermally conductive inorganic powder,
    a proportion of a surface area of the larger-diameter thermally conductive inorganic powder of the component (b) being 10% or less of a total surface area of the larger-diameter thermally conductive inorganic powder of the component (b) and the smaller-diameter thermally conductive inorganic powder of the component (c), and
    the thermally conductive resin composition having a thermal conductivity of 0.8 W/m·K or greater.

2. The thermally conductive resin composition according to claim 1, wherein the component (a) is at least one member selected from thermosetting resins, thermoplastic resins, and rubbers.

3. The thermally conductive resin composition according to claim 2, wherein the component (a) is a thermosetting resin and comprises a curing agent.

4. The thermally conductive resin composition according to claim 1, wherein the component (a) is a silicone rubber.

5. The thermally conductive resin composition according to claim 4, wherein the silicone rubber of the component (a) is cured with a platinum catalyst.

6. The thermally conductive resin composition according to claim 1, wherein the thermally conductive inorganic powders of the components (b) and (c) are each at least one member selected from alumina, zinc oxide, magnesium oxide, and silica.

7. The thermally conductive resin composition according to claim 6, wherein the alumina is α-alumina having a purity of 99.5 mass % or greater.

8. The thermally conductive resin composition according to claim 1, wherein an amount of volatilized gas derived from the component (c) is 5 μg/cm² or less.

9. The thermally conductive resin composition according to claim 1, wherein the specific surface area of each of the components (b) and (c) is a BET specific surface area and is measured according to JIS R1626.

10. The thermally conductive resin composition according to claim 1, wherein the amount of the silane compound is from 0.5 times to less than 1.0 times the amount of silane compound calculated according to a formula:

Amount of silane compound(g)=Amount of thermally conductive inorganic powder(g)×Specific surface area of thermally conductive inorganic powder $(m^2/g)$/Minimum silane coating area$(m^2/g)$, wherein the minimum silane coating area $(m^2/g)$ is calculated according to $[(6.02\times10^{23})\times(13\times10^{-20})$/molecular weight of silane].

11. The thermally conductive resin composition according to claim 1, wherein the smaller-diameter thermally conductive inorganic powder of the component (c) treated by coating with the silane compound or a partially hydrolyzed product thereof is mixed with the matrix component (a) in conjunction with the larger-diameter thermally conductive inorganic powder of the component (b).

12. The thermally conductive resin composition according to claim 1, wherein the silane compound or a partially hydrolyzed product thereof is coated on the smaller-diameter thermally conductive inorganic powder of the component (c) according to a dry method or a wet method.

13. The thermally conductive resin composition according to claim 12, wherein after coating the smaller-diameter thermally conductive inorganic powder of the component (c) with the silane compound or a partially hydrolyzed product thereof according to a dry method or a wet method, an unreacted material is removed.

14. The thermally conductive resin composition according to claim 1, wherein, regarding particles of the thermally conductive inorganic powders to be spherical, particles of the larger-diameter thermally conductive powder having a specific surface area of 0.06 to 1.0 $m^2/g$ have an average particle diameter of 20 μm or greater, and particles of the smaller-diameter thermally conductive powder having a specific surface area of greater than 1 to 20 $m^2/g$ have an average particle diameter of less than 20 μm.

* * * * *